(12) United States Patent
Anor et al.

(10) Patent No.: US 10,789,569 B1
(45) Date of Patent: Sep. 29, 2020

(54) SYSTEM TO DETERMINE ITEM FOOTPRINT

(71) Applicant: AMAZON TECHNOLOGIES, INC., Seattle, WA (US)

(72) Inventors: Tomer Anor, Brookline, MA (US); Midhun Harikumar, Marlborough, MA (US); Nicholas Charles McMahon, Bolton, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 343 days.

(21) Appl. No.: 15/823,283

(22) Filed: Nov. 27, 2017

(51) Int. Cl.
| | |
|---|---|
| *G06Q 10/08* | (2012.01) |
| *G06Q 20/20* | (2012.01) |
| *G06K 9/62* | (2006.01) |
| *G01G 19/414* | (2006.01) |
| *G06K 9/00* | (2006.01) |
| *G07G 1/00* | (2006.01) |

(52) U.S. Cl.
CPC ......... *G06Q 10/087* (2013.01); *G01G 19/414* (2013.01); *G06K 9/00771* (2013.01); *G06K 9/6228* (2013.01); *G06Q 20/203* (2013.01); *G06K 9/00201* (2013.01); *G07G 1/0081* (2013.01)

(58) Field of Classification Search
None
See application file for complete search history.

(56) References Cited

U.S. PATENT DOCUMENTS

| | | | |
|---|---|---|---|
| 7,225,980 | B2 | 6/2007 | Ku et al. |
| 7,949,568 | B2 | 5/2011 | Fano et al. |
| 8,009,864 | B2 | 8/2011 | Linaker et al. |
| 8,189,855 | B2 | 5/2012 | Opalach et al. |
| 8,630,924 | B2 | 1/2014 | Groenevelt et al. |
| 9,235,928 | B2 | 1/2016 | Medioni et al. |
| 9,473,747 | B2 | 10/2016 | Kobres et al. |
| 2007/0237382 | A1* | 10/2007 | Nuebling ........... B07C 3/14 382/141 |

(Continued)

OTHER PUBLICATIONS

Asthana, et al., "An Indoor Wireless System for Personalized Shopping Assistance", CiteSeerX, In Proceedings of IEEE Workshop on Mobile Computing Systems and Applications, 1994. Retrieved from the Internet: <URL:http://citeseerx.ist.psu.edu/viewdoc/summary?doi=10.1.1.127.3033>.

(Continued)

*Primary Examiner* — David Perlman
(74) *Attorney, Agent, or Firm* — Lindauer Law, PLLC

(57) ABSTRACT

Footprint data of an item that is representative of a boundary of the item and where that boundary is located is obtained using occlusion of a projected line. Line projectors are arranged at opposite sides of a conveyor belt and at an angle that is acute with respect to a plane of the conveyor belt and produce lines on the conveyor belt within a measurement area. As an item moves past the measurement area, the sides of the item occlude a portion of the projected lines. Cameras acquire a series of images as the object moves with respect to the measurement area. The images are processed to determine where the projected lines were occluded. An edge point is then determined representative of that location. One or more lines may be fitted to a plurality of edge points to determine the boundary of the item.

20 Claims, 11 Drawing Sheets

(56) References Cited

U.S. PATENT DOCUMENTS

| | | | |
|---|---|---|---|
| 2009/0245616 A1* | 10/2009 | De La Ballina | G06T 7/0004 |
| | | | 382/141 |
| 2011/0011936 A1 | 1/2011 | Morandi et al. | |
| 2011/0248083 A1* | 10/2011 | Bonner | G06F 16/00 |
| | | | 235/375 |
| 2012/0284132 A1 | 11/2012 | Kim et al. | |
| 2013/0284806 A1 | 10/2013 | Margalit | |
| 2015/0086107 A1 | 3/2015 | Dedeoglu et al. | |
| 2017/0116738 A1* | 4/2017 | Iida | H04N 13/0221 |

OTHER PUBLICATIONS

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_supermarkets>.

Pop, Cristian, "Introduction to the BodyCom Technology", AN1391, DS01391A, Microchip Technology, Inc., May 2, 2011.

Vu, et al., "Distinguishing Users with Capacitive Touch Communication", WINLAB, Rutgers University, In proceedings of: The 18th Annual International Conference on Mobile Computing and Networking ("MobiCom'12"), Aug. 22-26, 2012, Istanbul, Turkey.

* cited by examiner

US 10,789,569 B1

SYSTEM TO DETERMINE ITEM FOOTPRINT

BACKGROUND

A facility may handle a variety of different types of items of differing size and shape. Interactions with these items may be facilitated by gathering information such as a particular footprint of the item, location of the item, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
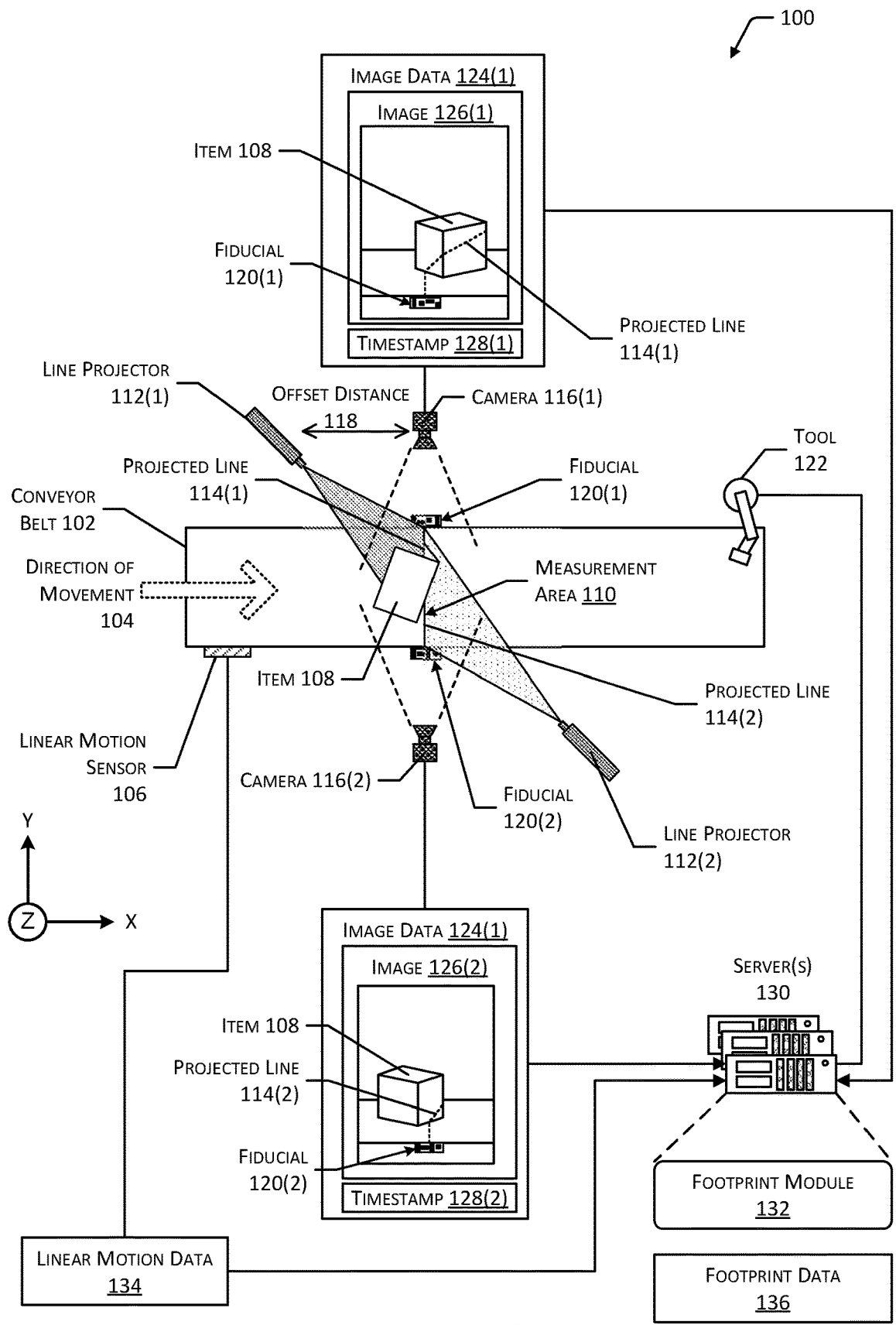
FIG. 1 illustrates a system to determine footprint data about an item based on occlusion of one or more projected lines, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to".

DETAILED DESCRIPTION

A facility that handles items may utilize information about the size, shape, and location of a footprint of an item. The footprint may be indicative of where the edges of the item are located. Information about the footprint, such as wherein a given space the edge of the item is located, may be used in various ways. For example, information about the size and shape of the footprint may be used to identify a particular item. Continuing the example, different types of items may be associated with different size boxes. By determining the size of the box, the type of the item contained inside may be determined. In another example, information about the size, shape, and location of the item may be used to control operation of tools such as printers, robot arms, chutes, cutting tools, and so forth. Continuing the example, information about the footprint of the item and the location and orientation of that footprint may be used to position a printer that applies a marking to the item. In still other examples, the footprint may be assessed for quality control purposes, such as to determine if a box is unsealed, if a manufactured part is incorrectly formed, and so forth.

The footprint of some types of items are particularly challenging to determine. For example, existing techniques may be unable to determine the footprint of items that are at least partially transparent or that exhibit specular reflections, such as in the case of a mirror finish.

Described in this disclosure are systems and techniques for determining footprint data about an item indicative of one or more of a boundary of part of an exterior of the item, a location in space of at least a part of the item, and so forth. These systems and techniques are suitable for determining footprint data about items with a wide variety of surfaces, including transparent materials such as glass or plastic, specularly reflective surfaces, and so forth.

One or more line projectors in different positions are used to produce one or more projected lines on a surface in a measurement area. The projected line results from the light from the line projector interacting with a surface, such as on the item or a conveyor belt. Within the measurement area is a material that produces a diffuse reflection of the light from the line projector, producing the projected line. In one implementation, the measurement area may be a designated location along a conveyor belt device with a moving conveyor belt. The surface of the conveyor belt itself moves past this designated location, with the measurement area remaining fixed as the projected lines are projected onto the surface of the moving conveyor belt. The measurement area may span the conveyor belt. A long axis of the measurement area may be perpendicular to a direction of motion of the moving conveyor belt. In some implementations, this perpendicular arrangement may reduce the computational complexity of the system.

One or more cameras are configured so their respective fields-of-view (FOV) include at least a portion of the measurement area. The one or more cameras are in different positions with respect to the one or more line projectors and the measurement area. For example, a first line projector may be on a first side of the conveyor belt and positioned above the conveyor belt at some offset distance that is perpendicular to a long axis of the measurement area. The first camera may be positioned along the long axis of the measurement area but above the conveyor belt as well. Likewise, a second line projector and a second camera may be similarly positioned on the opposite side of the conveyor belt. The first line projector and the second line projector may be arranged diagonal to one another with respect to the conveyor belt. For example, the first line projector may be positioned on a side that is upstream of the measurement area with respect to the direction of movement while the second line projector is positioned on a side that is downstream of the measurement area.

As an item moves past the measurement area, the exterior of the item occludes or otherwise interferes with the path of the projected lines. Meanwhile, the cameras are used to acquire images of the measurement area. Each image is associated with a particular linear displacement value that is representative of the displacement of the item with respect to the measurement area at a particular time. A first set of images are acquired from the first camera, while a second set of images are acquired from the second camera. As a result, the projected lines scan across the item and images are acquired.

A portion of the images that includes the projected line as it spans the conveyor belt unimpeded may be referred to as an analysis area. The analysis area of the image may be processed to determine an occlusion location which is the point at which the projected line on the conveyor belt is occluded or otherwise impeded. In some situations, two or more occlusion locations may be present in a particular image. The occlusion location that corresponds to the location in space that is closest to the camera acquiring the image may be retained, while the other occlusion locations may be disregarded from further consideration.

The linear displacement value is used to determine a first coordinate along an X axis that is parallel to the direction of motion of the conveyor belt. For example, as the item moves past the measurement area, a first image is acquired at a first time. The item continues moving, and a second image is taken at a second time. Given the speed of the conveyor belt, the linear displacement value may be 1 millimeter (mm) per image. The first image may thus be determined to have a first coordinate value of 0, while the second image has a second coordinate value of 1 mm along the X axis.

The occlusion may manifest as a portion of the projected line in the image disappearing, or exhibiting a drop of intensity to a value that is below a threshold value, at a particular pixel in the analysis area. An occlusion location indicates the location within the image at which the occlusion was deemed to occur.

The image may comprise pixels arranged in rows and columns, with each pixel having a location described with respect to these rows and columns. The occlusion location may be indicated with respect to these rows and columns of pixels. During setup of the system, coordinates of particular pixel locations within the images may be related to a particular point in space on the conveyor belt. For example, a transform function may be used to associate a pixel in row 253 column 93 with a location that is 27 centimeters from the right edge of the conveyor belt. Thus, the location of the occlusion in the image may be used to determine a second coordinate that is indicative of an actual location where the occlusion occurs on the surface supporting the item, for that particular image. For example, the second coordinate may specify a point along a Y axis that is perpendicular to the X axis.

The first coordinate and the second coordinate that are both associated with the same image are combined to produce an edge point. The edge point thus describes a particular point in space.

A plurality of edge points may be obtained, such as those generated by the first set of images obtained by the first camera and those from the second set of images obtained by the second camera.

Footprint data indicative of the locations of an exterior of the item may be determined by using line fitting algorithms to determine one or more fitted lines that fit the edge points. In other implementations, other techniques may be used.

Data indicative of the location of the item may be generated using the coordinates of the edge points, or the coordinates of the fitted lines. For example, the location of the item may be based on the fitted lines.

In other implementations the item may remain stationary while other elements of the system move. For example, one or more of the line projectors or the cameras may move around the stationary item.

The system and techniques described in this disclosure provide several advantages during operation. For example, the footprint data of an item may be determined regardless of the optical properties of the item. In another example, the system may be operated at high speeds, allowing the rapid determination of footprint data in high volume environments such as fulfillment or distribution centers.

The facility may include, or have access to, an inventory management system. The inventory management system may be configured to maintain information about items, users, condition of the facility, and so forth. For example, the inventory management system may maintain data indicative of what items have been received, what items have been shipped, what items a particular user has picked, environmental status of the facility, and so forth.

During operation, the inventory management system may use the footprint data to determine a type of item. For example, the size and shape of an unidentified item may be compared to previously stored item data. Based on a match that is within a threshold value, an identity of the unidentified item may be determined. In another implementation, the footprint data may be used to control a printer that applies a machine-readable code to items. The machine-readable code may then be used by the inventory management system to track items as they are picked, returned, received, shipped, and so forth.

Illustrative System

FIG. 1 illustrates a system 100 to determine footprint data about an item based on occlusion of one or more projected lines, according to some implementations.

A conveyor belt 102 is depicted that is moved in a direction of movement 104. A linear motion sensor 106 is designed to provide information about the movement 104 of the conveyor belt 102. An item 108 may be supported and moved by the conveyor belt 102. The item 108 may comprise a box, foodstuff such as a vegetable, or other object. As a result of the movement 104 of the conveyor belt 102, the item 108 is moved past a measurement area 110. One or more line projectors 112 provide one or more projected lines 114 within the measurement area 110. The line projectors 112 comprise a light source and one or more lenses or other devices that produce a plane of light. For example, the line projector 112 may comprise a laser light source that is then spread to form a plane of light using a cylindrical lens. When the light interacts with a surface, such as on the item 108 or the conveyor belt 102, the projected line(s) 114 may be detectable by the camera 116. The examples provided in this disclosure illustrate the use of projected lines 114 that are straight. In other implementations the projected lines 114 may be curved. In still other implementations, a pattern of projected lines may be used. For example, instead of a single projected line, a grid of lines may be projected.

In this illustration, a first line projector 112(1) is located "upstream" of the measurement area 110 and projects light onto a surface of the conveyor belt 102 in the measurement area 110 producing a first projected line 114(1). A second line projector 112(2) is located "downstream" of the measurement area 110 and projects light onto the surface of the conveyor belt 102 in the measurement area 110 producing a second projected line 114(2). The projected line(s) 114 may be arranged such that they are perpendicular to the direction of movement 104. In some implementations the projected lines 114(1) and 114(2) may overlap one another or otherwise appear on the same section of the surface of the conveyor belt 102.

Other arrangements of projected line(s) 114 may be used. For example, the projected line(s) 114 may be non-perpendicular to the direction of movement 104. Continuing the example, the projected line(s) 114 may form an acute angle with respect to a lateral edge of the conveyor belt 102. In another example, the projected line(s) 114 may not intersect with one another.

One or more cameras 116 are positioned where their respective fields-of-view (FOV) include one of the projected lines 114. For example, a first camera 116(1) is positioned on the same side of the conveyor belt 102 as the first line projector 112(1). The first camera 116(1) is positioned at some offset distance 118 with respect to the first line projector 112(1). For example, the first camera 116(1) may be positioned along a line through a long axis of the measurement area 110, that is, a line perpendicular to the direction of movement 104. Likewise, a second camera 116(2) may be positioned on the opposite side of the conveyor belt 102, on the same side as the second line projector 112(2).

The cameras 116 are able to detect the projected line 114. For example, if the projected line 114 is monochromatic light with a wavelength of 500 nanometers (nm), the camera 116 may comprise photosites that are sensitive to 500 nm. The cameras 116 may comprise an image sensor that is two-dimensional, having photosites arranged in rows and columns. The image sensor may be sensitive to one or more wavelengths. For example, the image sensor may be able to detect wavelengths including terahertz, infrared, visible, ultraviolet, and so forth. The cameras 116 may comprise charge coupled devices (CCD), complementary metal oxide semiconductor (CMOS) devices, and so forth. In some implementations the cameras 116 may be equipped with filters. For example, a narrowband filter may be included in an optical path of the camera 116 such that light with the wavelength of line projector 112 is passed but other wavelengths are attenuated or blocked.

One or more fiducials 120 may be present within the FOV of the cameras 116. The fiducials 120 may be used to facilitate calibration of the cameras 116, provide for information used to map a particular pixel location in an image with a physical location within the measurement area 110, and so forth.

One or more tools 122 may be positioned adjacent to the conveyor belt 102 downstream of the measurement area 110. In one implementation, the tool 122 may comprise a printer that is designed to apply one or more markings to the item 108. For example, the printer may use a continuous inkjet printhead to print a machine-readable code upon the item 108. In another implementation, the tool 122 may comprise a mechanical arm or effector that is designed to lift or move the item 108.

During operation of the system 100, the cameras 116 acquire image data 124. For example, the first camera 116(1) may produce first image data 124(1) while the second camera 116(2) produces second image data 124(2). The image data 124 may include data representative of one or more images 126 of the measurement area 110 and one or more of the fiducials 120. For example, the image data 124 may comprise a set of still images, video, and so forth. The image data 124 may also include a timestamp 128 that provides information indicative of when a particular image 126 was acquired. The timestamp 128 may comprise data indicative of a time as measured by a clock, a counter value, a sequence value, and so forth.

The image data 124 is provided to a server 130. For example, the cameras 116 and the server 130 may be connected to a network that is used to transfer the image data 124. The server 130 may comprise one or more computing devices that execute a footprint module 132. The footprint module 132 may use the image data 124 and other information such as linear motion data 134 to generate footprint data 136. The linear motion data 134 comprises information about the displacement or movement of the surface such as the conveyor belt 102 with respect to the measurement area 110 during operation. For example, the linear motion sensor 106 may comprise an encoder that reports the linear movement of the conveyor belt 102 between a first time and a second time. This linear motion data 134 may be used to determine a linear displacement value indicative of how far the conveyor belt 102, and the item 108 that is supported thereon, has moved between images 126.

The linear displacement value between images 126 may be used to represent a first coordinate in real space, as the projected line 114 scans the item 108 due to the movement of the conveyor belt 102. For example, the first coordinate may be along an X axis that is parallel to the direction of movement 104.

As discussed below in more detail with regard to FIG. 3, the footprint module 132 processes the image data 124 to determine an occlusion location that represents a feature change in the projected line 114 in the measurement area 110 that is captured in the image 126. The feature change results from the occlusion or other interaction of the projected line 114 with the edge of the item 108. For example, an edge of the item 108 may result in the projected line 114 appearing to change direction, change intensity, and so forth. The location of this feature change in the image 126, that is the coordinates in the pixel space of the image 126, may be mapped to a second coordinate in real space in the measurement area 110 on the conveyor belt 102. This second coordinate may be along a Y axis that is perpendicular to the X axis described above.

By observing the occlusion of the projected line 114 with respect to the surface of the measurement area 110, the system 100 is able to determine the edges of items 108 that have been traditionally difficult to assess using other techniques. For example, the footprint data 136 may be determined for transparent items 108 such as bottles of water or items 108 with mirror finishes such as polished metal.

A first coordinate and a second coordinate associated with a particular image 126 may be used to determine an edge point. Edge points may be determined from the image data 124 acquired from the one or more cameras 116 as the item 108 moves through the measurement area 110. For example, the first image data 124(1) may be processed to determine the edge points of a left side of the item 108 while the second image data 124(2) may be processed to determine the edge points of a right side of the item 108.

One or more line fitting algorithms may use the edge points to determine fitted lines that describe the outline of the item 108 as it sat on the surface of the conveyor belt 102, or footprint, during passage through the measurement area 110. The footprint data 136 may be provided that is indicative of a physical boundary or edge of the item 108 that is close to or in contact with the surface such as the conveyor belt 102 during scanning. The footprint data 136 may also include information indicative of a location of the item 108. For example, the footprint data 136 may include information about where the item 108 is on the conveyor belt 102.

The footprint data 136 may be used in a variety of ways. In one example, the footprint data 136 may be used to identify the type of item 108. For example, the footprint data 136 may be compared to determine if the shape and dimensions match to or are within a threshold value of previous values. In another example, the footprint data 136 may be used in the operation of other devices. For example, the tool 122 such as a printer may use the footprint data 136 to position a printhead at a particular distance and orientation with respect to the side of the item 108, such that one or more markings may be applied to the item 108 as it passes by the tool 122 on the conveyor belt 102.

Figure 2:
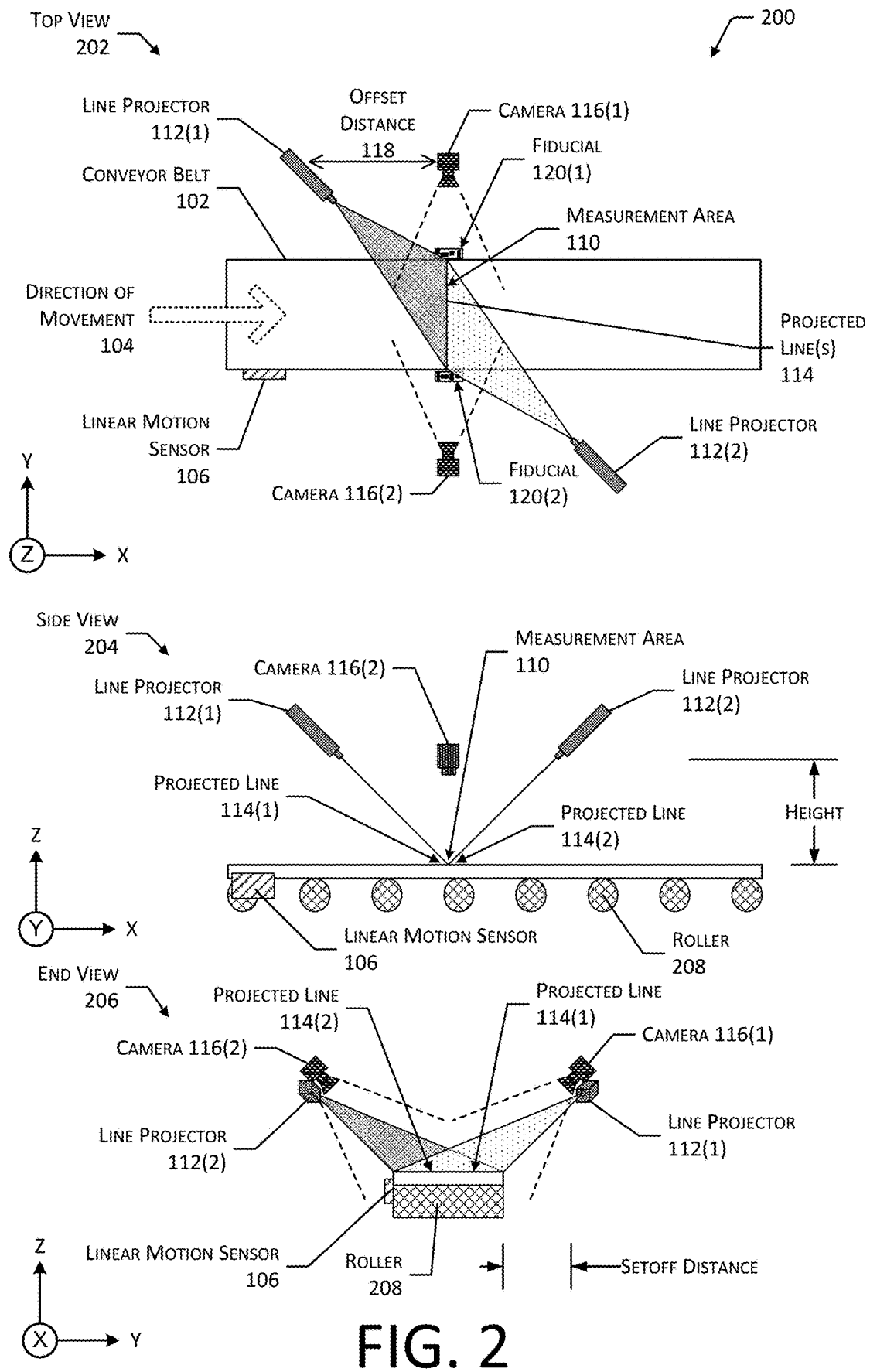
FIG. 2 illustrates various views of the system to determine footprint data, according to some implementations.

FIG. 2 illustrates various views 200 of the system to determine footprint data 136, according to some implementations. Depicted are a top view 202 looking down on the system 100, a side view 204, and an end view 206.

The top view 202 depicts the view as shown in FIG. 1. A line projector 112 and a camera 116 are positioned on either side of the conveyor belt 102. The line projector 112 and the camera 116 on a side of the conveyor belt 102 are separated from one another by an offset distance 118. The first line projector 112(1) is at a first position that is upstream of the measurement area 110, while the second line projector 112(2) is at a second position that is downstream of the measurement area 110. In this illustration the projected lines 114(1) and 114(2) overlap one another in the measurement area 110. In the implementation depicted, both line projectors 112(1) and 112(2) may produce projected lines 114 that have the same or similar wavelengths. In other implementations, the line projectors 112(1) and 112(2) may produce projected lines 114(1) and 114(2) at different wavelengths or colors.

In some implementations, such as shown here, the line projectors 112 may be arranged opposite one another, such that they are pointing generally towards one another. In other implementations, the line projectors 112 may be arranged at different angles relative to the measurement area 110.

The cameras 116(1) and 116(2) are depicted as being aligned along a long axis of the measurement area 110, that is along a line that is perpendicular to the direction of movement 104 of the conveyor belt 102. In other implementations the cameras 116 may be placed at other positions. These other positions may be such that the FOV of the camera 116 includes at least a portion of the measurement area 110. For example, the first camera 116(1) may be positioned downstream of the measurement area 110.

The side view 204 shows the placement of the line projectors 112 that produce the projected lines 114 above the surface of the conveyor belt 102. As shown each line projector 112 is positioned at a height with respect to the surface that is non-zero, that is, greater than zero. The angle between the projected line 114 and a plane of the surface of the conveyor belt 102 is less than 90 degrees. In this illustration, the camera 116(2) is shown, also directed such that the FOV of the camera 116(2) includes at least a portion of the measurement area 110. Also shown in the side view 204 are the rollers 208 of the conveyor belt 102.

The end view 206 shows the placement of cameras 116 and the line projectors 112 at the height above the surface of the conveyor belt 102 and also at some setoff distance with respect to a lateral edge of the conveyor belt 102. In some implementations the setoff distance is greater than zero.

As depicted in these views 200, the camera 116 is positioned to have a FOV that includes at least a portion of the projected line 114 as it appears in the measurement area 110 during operation. The camera 116 and the associated line projector 112 are located at some offset distance from one another. This offset distance may be expressed as a distance in a plane that is parallel to, or projected onto, the surface upon which the item 108 rests in the measurement area 110. For example, the offset distance may be the distance measured within a plane of the conveyor belt 102.

As depicted in these views 200, the camera 116 and the line projector 112 are at some height to the plane of the surface upon which the item 108 rests in the measurement area 110.

In other implementations, other positions of one or more of the cameras 116 or line projectors 112 may be utilized. For example, different line projectors 112 may be placed at different heights, different cameras 116 may be placed at different offset distances, and so forth.

This disclosure discusses the implementation in which the item 108 is moved past the measurement area 110, such as under the influence of the conveyor belt 102. In other implementations other techniques may be used to scan the item 108 and determine the footprint data 136. For example, the item 108 may rest on a stationary platform while one or more of the line projectors 112 or cameras 116 are mounted to a gantry that moves with respect to the item 108. The movement of the gantry may be manual, or may use one or more actuators. Continuing the example, the one or more actuators may comprise rotary motors, linear motors, hydraulic devices, and so forth. In another implementation, the item 108 and the line projector 112 may remain stationary, while the projected line 114 is displaced across the surface upon which the item 108 is resting. In yet another implementation, the item 108 may remain stationary on the surface and a plurality of projected lines 114 may be projected onto the surface.

The system 100 may include other sensors (not shown). For example, sensors may be used to determine a height of the item 108. The sensors may include one or more of ultrasonic distance sensors, infrared distance sensors, photoelectric detector arrays, structured light depth cameras, and so forth. For example, an ultrasonic distance sensor positioned above the measurement area 110 on the conveyor belt 102 may have a sensor field-of-view directed downward and resulting distance data may be output that is used to determine the height of the item 108. In other implementations, other sensors or techniques may be used to determine the height of the item 108.

Other configurations may also be utilized. For example, instead of a conveyor belt 102, items 108 may be suspended from overhead. In another example, the measurement area 110 may comprise a section with a window, such as positioned within a gap between two conveyor belts, and the line projectors 112, cameras 116, and so forth may be positioned beneath window. In yet another example, the conveyor belt 102 may be transparent or otherwise configured such that projected lines 114 may at least partially pass through and images 126 may be acquired. Continuing this example, the conveyor belt 102 may comprise a mesh or plurality of strips.

Figure 3:
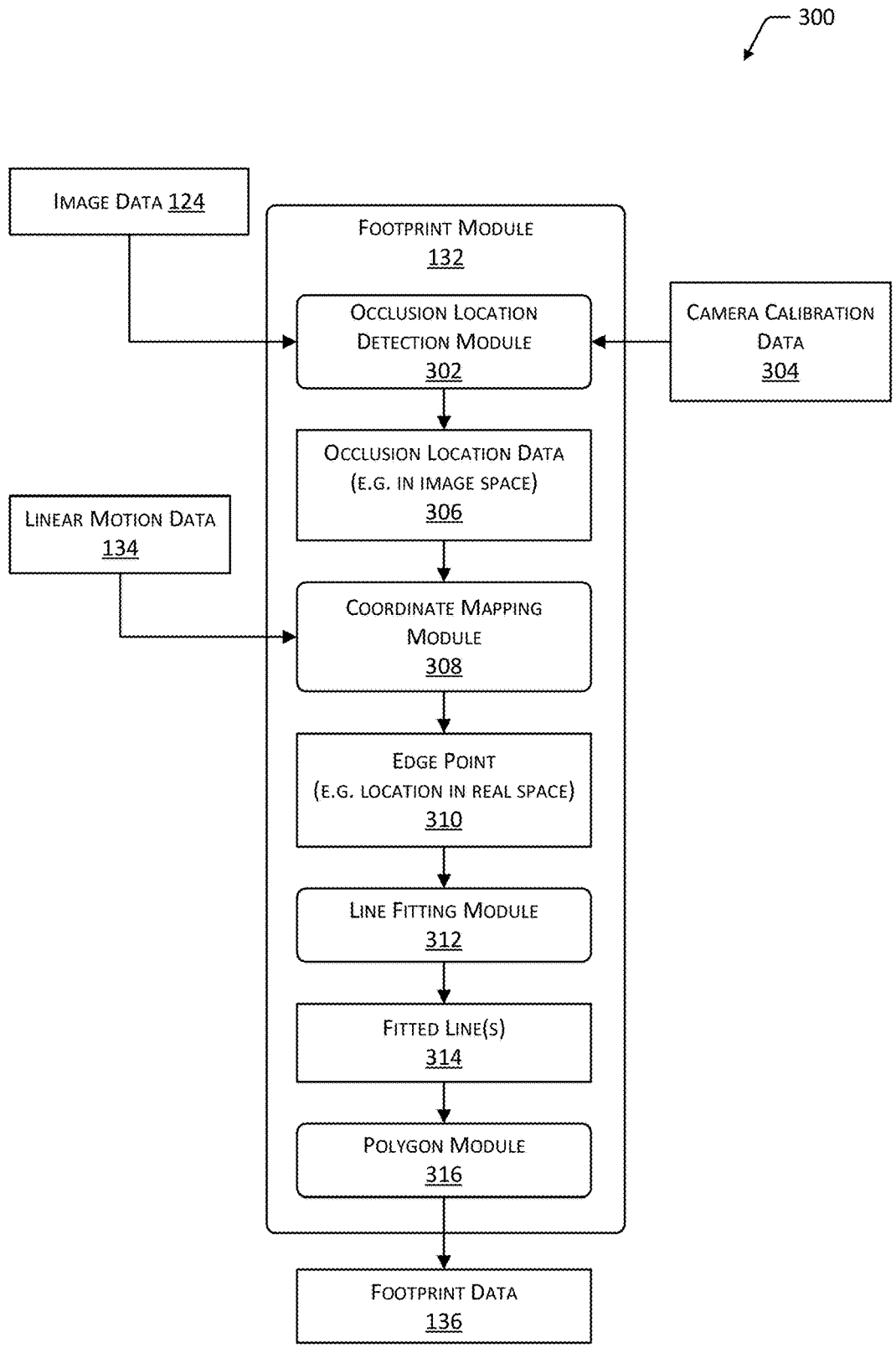
FIG. 3 is a block diagram of a footprint module that generates footprint data based on the occlusion of a projected line, according to some implementations.

FIG. 3 is a block diagram 300 of the footprint module 132 that generates footprint data 136 based on the occlusion of a projected line 114, according to some implementations.

The footprint module 132 may include one or more of the following modules. In some implementations the functions of one or more modules may be combined or separated. Operation of these modules may be performed, at least in part, using one or more tools available in the OpenCV libraries as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used. In still another implementation, functions such as those in the Machine Vision Toolbox for Matlab (MVTB) available using MATLAB as developed by MathWorks, Inc. of Natick, Mass., USA, may be utilized.

An occlusion location detection module 302 is calibrated using camera calibration data 304. The camera calibration data 304 may include intrinsic camera parameters and extrinsic camera parameters. The intrinsic camera parameters for an individual camera 116 may include a perspective projection matrix that maps points in three-dimensional (3D) space to points in a source image, radial distortion parameters representative of radial lens distortion, tangential distortion parameters representative of tangential distortion between a camera lens and a camera sensor, and so forth. For example, the intrinsic camera parameters provide information that relates the actual camera 116 with an idealized model of a pinhole camera. The radial and tangential distortion parameters may be representative of lens aberration, also known as geometrical nonlinear distortion.

The extrinsic parameters for the individual camera 116 may include rotation data indicative of rotation of the individual camera 116 with respect to a calibration object or marking, translation data indicative of translation of the individual camera 116 with respect to the calibration object or marking, and so forth. For example, the extrinsic parameters may provide information about the pose of the camera 116 with respect to one or more fiducials 120 that are depicted in the image 126.

In one implementation in which the OpenCV library is being utilized, the camera calibration data 304 may be determined using the calibrateCamera function. In other implementations, other techniques may be used to determine the camera calibration data 304.

The camera calibration data 304 may be determined at particular times, such as during setup or initialization of the system 100. In other implementations the camera calibration data 304 may be determined on an ongoing basis. For example, the camera calibration data 304 may be determined at different times using the images 126.

As mentioned above, the occlusion location detection module 302 uses the camera calibration data 304 to account for the variances in different cameras 116. In some implementations, camera calibration data 304 may be determined for each camera 116, and may be used to adjust the processing of images 126 acquired from that particular camera 116.

The occlusion location detection module 302 processes the image data 124 to determine occlusion location data 306 for a particular image 126. The occlusion location data 306 is indicative of the position of an occlusion location of the projected line 114 within a particular image 126. The occlusion location may be expressed in terms of coordinates of elements within the image 126. For example, the image 126 may be expressed as pixels arranged in rows and columns. Within the image space, or image coordinates, a particular pixel may be referenced based on the particular row and column. For example, the occlusion location data 306 may indicate an occlusion is present in the image 126 at the pixel located at row 253 and column 93.

The occlusion location detection module 302 may determine the occlusion location data 306 based on the presence of a feature change of the projected line 114 with respect to the surface of the measurement area 110. Given the differences in the relative positions of the line projector 112 and the camera 116 with respect to the measurement area 110, when a portion of the projected line 114 interacts with an edge of an item 108 a feature change occurs. This feature change may result in a change in apparent direction of the projected line 114 in the image 126. For example, the projected line 114 may appear to suddenly change direction and exit the measurement area 110. In another example, the slope of a portion of the projected line 114 in the image 126 may change. The feature change may result in a transition from presence to absence of the projected line 114 in the image 126. For example, the projected line 114 may be visible on the surface of the conveyor belt 102, but disappears when it is refracted by the transparent glass of a bottle of water. The feature change may result in a change in intensity in the projected line 114. For example, when the projected line 114 transitions from a brightly visible line on the surface of the measurement area 110 to a dim line on a matte black surface of the item 108, the intensity of the pixels representing the line may drop from a brightness value of 241 to 17, below a threshold value of 100. The feature change may result in a change in polarization of the projected line 114 that exceeds a threshold value. For example, the projected line 114 that is reflected by the surface of the measurement area 110 may exhibit a polarization of 0 degrees, while the light of the projected line 114 that is reflected by the item 108 may exhibit a polarization of 45 degrees, in excess of a threshold value of 10 degrees. In other implementations, other techniques may be used to determine the feature change.

In some implementations, one or more of the different techniques to determine the feature change may be used to determine the occlusion location data 306. For example, two or more of the different techniques to determine the feature change may be used in conjunction with one another. For example, the occlusion location data 306 may use an average of the feature change locations determined based on absence of the projected line, apparent change in direction, and polarization change.

A coordinate mapping module 308 is used to determine the coordinates with respect to real space of one or more edge points 310. For example, the edge points 310 may be expressed in terms of coordinates with respect to an X axis that is parallel to the direction of movement 104 of the conveyor belt 102 and a Y axis that is perpendicular to the X axis. For example, the edge point 310 may be expressed in coordinates such as 27 centimeters (cm) along the X axis and 39 cm along the Y axis.

The coordinate mapping module 308 may use the linear motion data 134 to determine a first coordinate with respect to the X axis. For example, in the implementations depicted here the measurement area 110 and projected lines 114 are in fixed locations, and the item 108 moves past the projected lines 114. The linear motion data 134 provides information about the displacement of the item 108 between the images 126 that are acquired. As a result, the linear motion data 134 may be used to determine the linear displacement value, such as 1 cm of movement of the item 108 between images 126. Based on this movement, the position along the X axis may be determined. Continuing the example, the coordinate of the projected line 114, and the occlusion location, may be designated as being 1 cm.

The coordinate mapping module 308 may be configured to reset values of the X axis when a first edge point 310 is determined. For example, after an interval in which no edge points 310 have been determined, a next edge point 310 may be designated as a starting edge point 310, and an initial coordinate along the X axis may be reset to zero as of that edge point 310. Subsequent linear motion data 134 may then be determined with respect to that zero value.

The coordinate mapping module 308 may use the information about the occlusion location data 306 to determine the second coordinate of the edge point 310 along the Y axis. In one implementation, a transform matrix may be used to associate a particular pixel location in terms of one or more of rows or columns in the image 126 with a particular location with regard to the Y axis. In this way, the occlusion location data 306, that is indicative of a location with respect to the image 126 is transformed into a location in real space with respect to one or both of the X or Y axes. The coordinate mapping module 308 is discussed in more detail below with regard to FIG. 6.

As images 126 are acquired while the item 108 is scanned by the projected line 114, the edge points 310 that are representative of the boundaries of the exterior of the item 108 are obtained.

In some implementations, the cameras 116 may utilize a global shutter. A global shutter allows for acquisition of an entire image 126 at one time. In comparison, a rolling shutter acquires lines in the image 126 in sequence, which may introduce distortion of a motion object. Acquisition of image data 124 by the cameras 116 as well as the acquisition of linear motion data 134 may be synchronized such that at particular time intervals this image data 124 and linear motion data 134 are acquired. By using cameras 116 with global shutter functionality, the image distortion produced by a rolling shutter is avoided.

In some implementations, the footprint data 136 may comprise the edge points 310. In other implementations described next, additional processing may be performed to produce the footprint data 136.

A line fitting module 312 may use one or more line fitting algorithms to determine one or more fitted lines 314 that correspond to the edge points 310. For example, the line fitting module 312 may implement maximum likelihood-type estimation techniques, such as a least-squares estimator to produce fitted lines 314. In one implementation, the line fitting algorithm may fill a buffer by iteratively adding edge points 310 while traversing the coordinate space in a particular direction, such as clockwise or anti-clockwise, until a line fit error is greater than a threshold value. The points in the buffer may then be saved as representative of an edge of the item 108.

In one implementation, information indicative of the fitted lines 314 may be provided as the footprint data. For example, the line may be expressed in terms of endpoint coordinates, as a function, and so forth. In another implementation, the fitted lines 314 may be further processed by a polygon module 316.

The polygon module 316 may be configured to determine a closed polygon that is representative of the footprint of the item 108. For example, if the item 108 is a cubical box, the footprint of the item 108 may represent a square that is defined by the coordinates of two opposing edge points 310.

In some implementations other techniques may be used to determine the footprint data 136. For example, if the system 100 is scanning items 108 that have known or predetermined shapes, that information may be used to determine the footprint data 136. Continuing the example, a plurality of candidate item shapes may describe the size and shape of boxes associated with different types of items 108. A plurality of edge points 310 may be determined, and compared to determine if there is a correspondence with at least a portion of those edge points 310 and the candidate item shapes. For example, if one edge point 310 is determined for each of the four vertical sides of a box, those four points may be used to select that type of item 108 from the candidate item shapes. The footprint data 136 may then express the edges of that selected shape, with the edge points 310 fixing that shape in real space.

Figure 4:
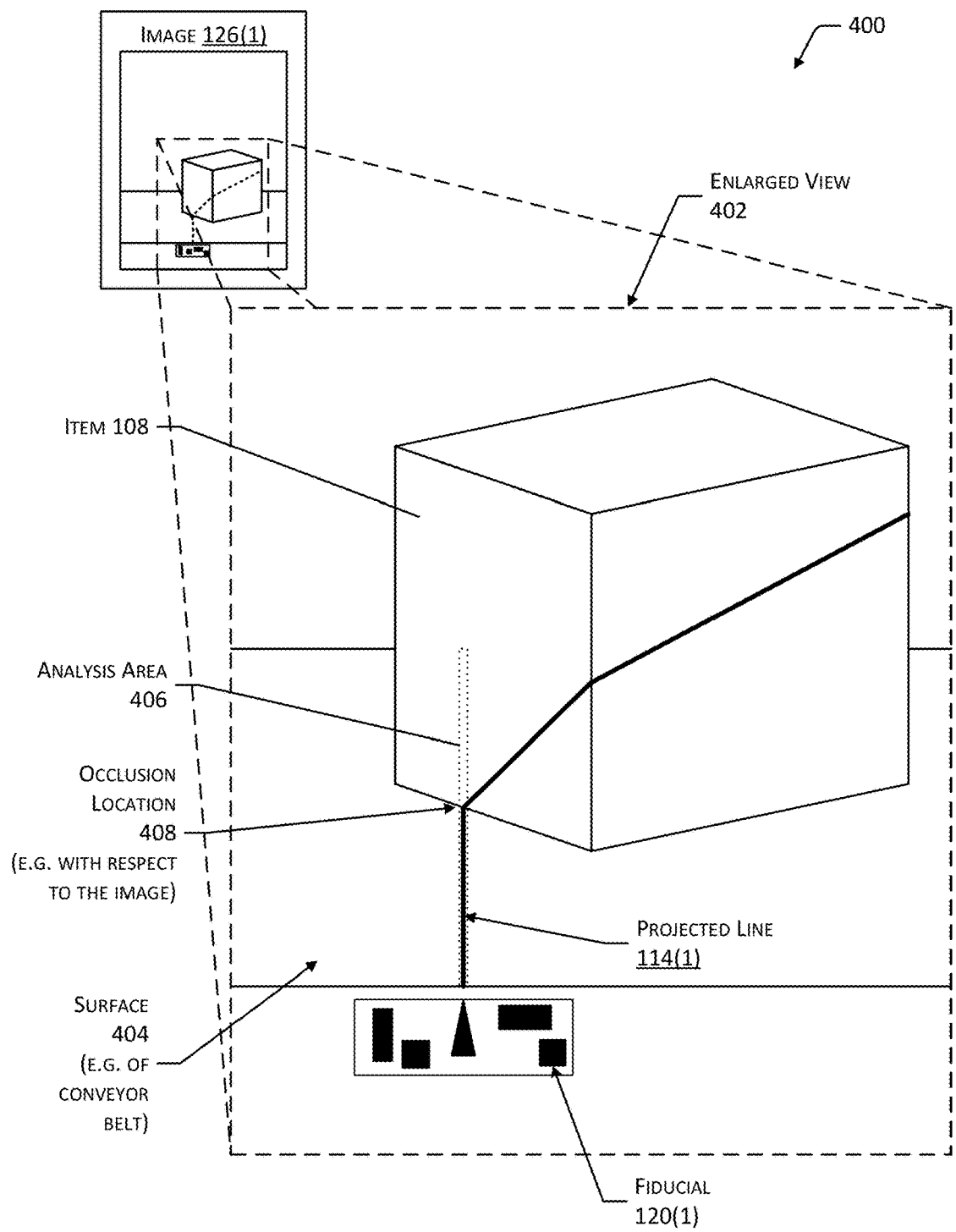
FIG. 4 is an enlarged view of an image including an analysis area in which the projected line is occluded, according to some implementations.

FIG. 4 is a view 400 of the image 126(1). An enlarged view 402 shows a portion of the image 126(1) in greater detail. Present in the image 126(1) is the item 108 resting on a surface 404. For example, the surface 404 in this illustration is the conveyor belt 102. The surface 404 may be configured to provide a diffuse reflection, resulting in the projected line 114.

As described above, the first line projector 112(1) projects the projected line 114(1) onto the surface 404 within the measurement area 110 (not shown). An analysis area 406 is shown. The analysis area 406 comprises a portion of an image 126 within which the projected line 114 is expected to appear to be when unimpeded. For example, the analysis area 406 may extend from one lateral edge of the conveyor belt 102 to the other. The analysis area 406 may be relatively narrow with respect to the length. For example, the analysis area 406 may be 10 pixels wide. The analysis area 406 comprises the portion of the image 126 that is used to determine an occlusion location 408. For example, the analysis area 406 may comprise a rectangle that is defined by a first set of coordinates with respect to the image 126 and a second set of coordinates with respect to the image 126.

As described above, the occlusion location 408 is indicative of where, with respect to the image 126, the projected line 114 experiences an interaction with the item 108. The occlusion results from the item 108 interacting with the projected line 114 before that projected line 114 would otherwise interact with the surface 404 in the measurement area 110. This interaction may result in an apparent feature change. In this illustration, the feature change is manifested by the absence of the projected line 114(1) in a portion of the analysis area 406 and the change in direction of the projected line 114(1). In implementations where the feature change that is detected by the footprint module 132 is a change in line direction, the analysis area 406 may be relatively wide. This additional width allows several points along the projected line 114 to be detected and used to determine the change in direction.

The projected line 114(1) as shown here progresses from a lateral edge of the surface 404 of the conveyor belt upwards in the image 126 until the item 108 is encountered. In some implementations, the item 108 may be relatively short, may include holes, or may be otherwise shaped such that a plurality of occlusion locations 408 are present in the analysis area 406. In some implementations the determination of the edge point 310 for a particular image 126 may utilize the occlusion location 408 that is closest to the edge of the surface 404 that is closest to the camera 116. For example, the occlusion location 408 having the lowest row number may be used while those with greater row numbers are discarded from further consideration.

As described above, the image 126 may include one or more fiducials 120. The fiducials 120 may be used to determine the camera calibration data 304. For example, the fiducials 120 may be recognized in the image 126 and processed to determine extrinsic parameters such as the pose of the camera 116 with respect to the surface 404. A plurality of fiducials 120 may be arranged such that they are present within the image(s) 126 acquired by the camera(s) 116. For example, within the field-of-view of the camera 116 may be three separate groupings of fiducials 120. In some implementations, a particular fiducial 120 or other indicia may be used to designate the expected location of the projected line 114. For example, a fiducial may comprise an isosceles triangle with an apex of the isosceles triangle marking a location at which the projected line 114 intersects a lateral edge of the conveyor belt 102. The fiducials 120 comprise markings or other features which produce features in the image 126. For example, the fiducials 120 may comprise a mark that is printed or painted onto a surface.

In some implementations, a linear image sensor may be utilized instead of a two-dimensional image sensor array. For example, the linear image sensor may comprise semiconductor photosites that are arranged in a straight line. These photosites may be configured to generate an electric signal responsive to incident light. As a result, the image data 126 produced would comprise a single column with many rows. In such an implementation, the analysis area 406 may have a width of one pixel.

Projected lines 114 having different wavelengths or colors may be used in some implementations. For example, the projected line 114(1) may be green while a third line projector 112(3) on the same side of the conveyor belt 102 but at a different position produces a projected line 114(3) that is red. The footprint module 132 may be configured to assess the projected line(s) 114 based on these color differences. For example, the camera 116(1) may be configured to acquire color image data 124 and the image 126 may be processed to assess two analysis areas 406(1) and 406(2) corresponding to the green and red lines, respectively.

Additional line projectors 112 presenting projected lines 114 with the same or different wavelengths may be used to increase the number of edge points 310 detected, increasing resolution of the footprint. As described above, the projected line(s) 114 may be arranged at other, non-perpendicular, angles relative to the direction of movement 104. By utilizing line projectors 112 at different locations, projected lines 114 at different angles on the measurement area 110, or combinations of the two, the system 100 is able to reliably scan an item 108 regardless of the relative orientation. For example, in the case of a single projected line 114 and a single camera 116, a cubical item 108 could be oriented at an angle such that no feature change in the projected line 114 is apparent. However, by utilizing multiple projected lines 114 and different relative angles with respect to the conveyor belt 102, the discontinuities in other projected lines 114 formed by edges of the item 108 may be determined and used to generate edge points 310.

In some implementations, a physical or mechanical slot filter may be used to isolate the analysis area 406. For example, a mask may be placed in an optical path of the camera 116 such that the analysis area 406 and the fiducial(s) 120 are visible, but the remaining portion of the scene is blocked out.

Figure 5:
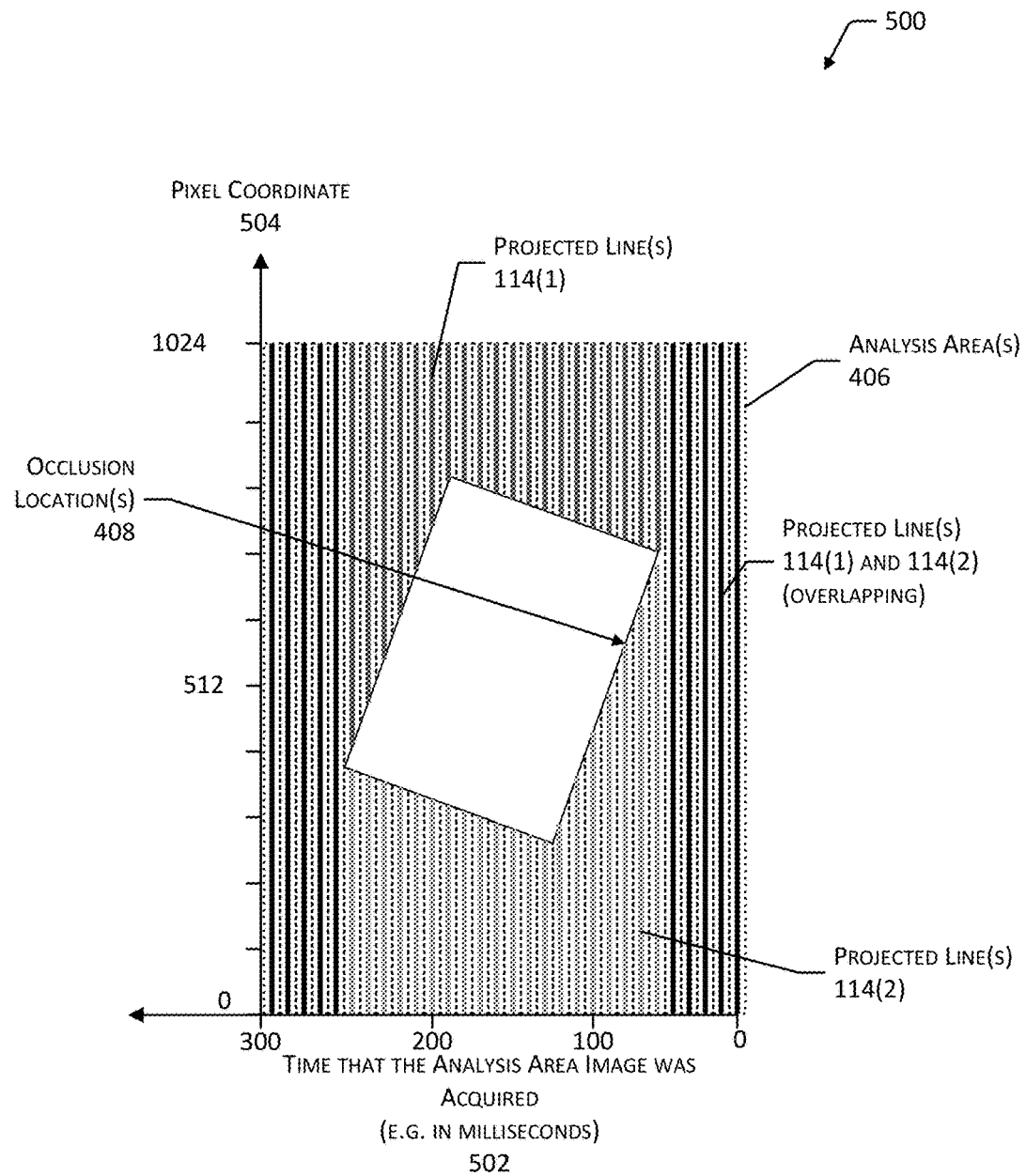
FIG. 5 illustrates a compilation of analysis areas obtained at different times and relative linear displacements, according to some implementations.

FIG. 5 illustrates a compilation 500 of analysis areas 406 obtained at different times and relative linear displacements, according to some implementations. In this illustration, a horizontal axis 502 corresponds to the time at which the image 126 which provided the analysis area 406 was acquired. With regard to the conveyor belt 102 implementation as described above, or another case in which the surface 404 moves, the horizontal axis could be indicative of relative linear displacement instead of time.

Each analysis area 406 comprises a "slice" that was acquired at a particular time. Continuing the example, the rightmost analysis area 406 was acquired at time=0 milliseconds (ms), such as prior to the item 108 passing through the measurement area 110, while the leftmost analysis area 406 was acquired at time 300 ms, after the item 108 has passed through the measurement area 110.

A vertical axis depicts a pixel coordinate 504, such as a row number. In this example, the pixel count ranges from row 0 to row 1024. The projected lines 114(1) and 114(2) are shown. The occlusion locations 408 are the points on the surface 404 at which the projected line 114 thereon is occluded or otherwise disrupted.

As depicted, the interaction of the item 108 with the projected lines 114 has provided a series of occlusion locations 408 that outline the item 108 on the surface 404.

Figure 6:
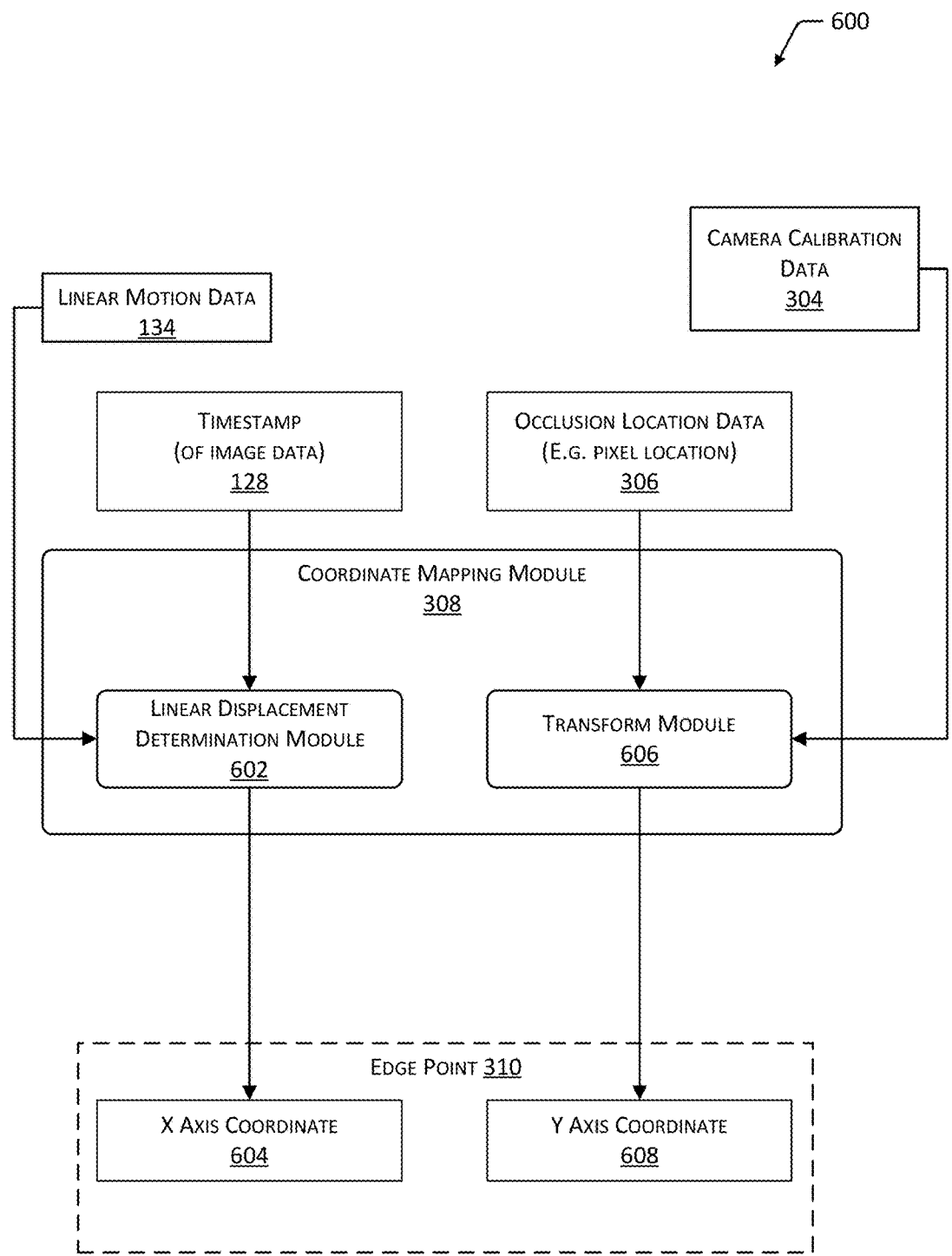
FIG. 6 is a block diagram of a coordinate mapping module that determines coordinates of edge points based on linear displacement and occlusion location, according to some implementations.

FIG. 6 is a block diagram 600 of the coordinate mapping module 308 that determines coordinates of edge points 310 based on linear displacement and occlusion location data 306, according to some implementations.

The coordinate mapping module 308 may include a linear displacement determination module 602 that accepts as input timestamp(s) 128 associated with a particular image 126 and linear motion data 134. The linear motion data 134 comprises information about the displacement or movement of the surface 404, such as the conveyor belt 102, with respect to the measurement area 110 during operation. For example, the linear motion data 134 may indicate that between a first time and a second time the conveyor belt 102 moved 10 cm. In this implementation, the linear displacement determination module 602 may generate an X axis coordinate 604 for an image 126 that indicates a location of 10 cm along the X axis for that image 126.

In another implementation, the linear motion data 134 may indicate that the conveyor belt 102 was moving at a speed of 1 meter per second. Based on that speed, the linear displacement determination module 602 may generate an X axis coordinate 604 for an image 126. For example, given each image 126 being acquired at 10 milliseconds intervals, the occlusion location 408 may be associated with a point along an X axis that is determined by the elapsed time multiplied by the velocity. For example, for the image 126(10) acquired at time=0, no displacement and so x=0, for the image 126(11) acquired at time=100 ms then x=10 cm, for the image 126(12) acquired at time=200 ms then x=20 cm, and so forth.

The occlusion location data 306 may be processed by a transform module 606. The transform module 606 may provide a transform function, matrix, or other data that is indicative of a relationship between a particular pixel coordinate within the image 126 and a physical location along the Y axis of the measurement area 110. The transform module 606 may utilize the camera calibration data 304. For example, a particular transform matrix may be generated for a particular camera 116 and based on the pose of that camera 116. As a result, different cameras 116 may be processed using different transform matrices.

Based on the occlusion location data 306 provided as input, the transform module 606 may provide as output a Y axis coordinate 608, indicative of a position of the occlusion location 408 along the Y axis that is orthogonal to the X axis in the plane of the surface 404.

The coordinate mapping module 308 produces, for a particular image 126 in which an occlusion location 408 has been detected, the edge point 310 that is indicative of an X axis coordinate 604 and a Y axis coordinate 608.

Figure 7:
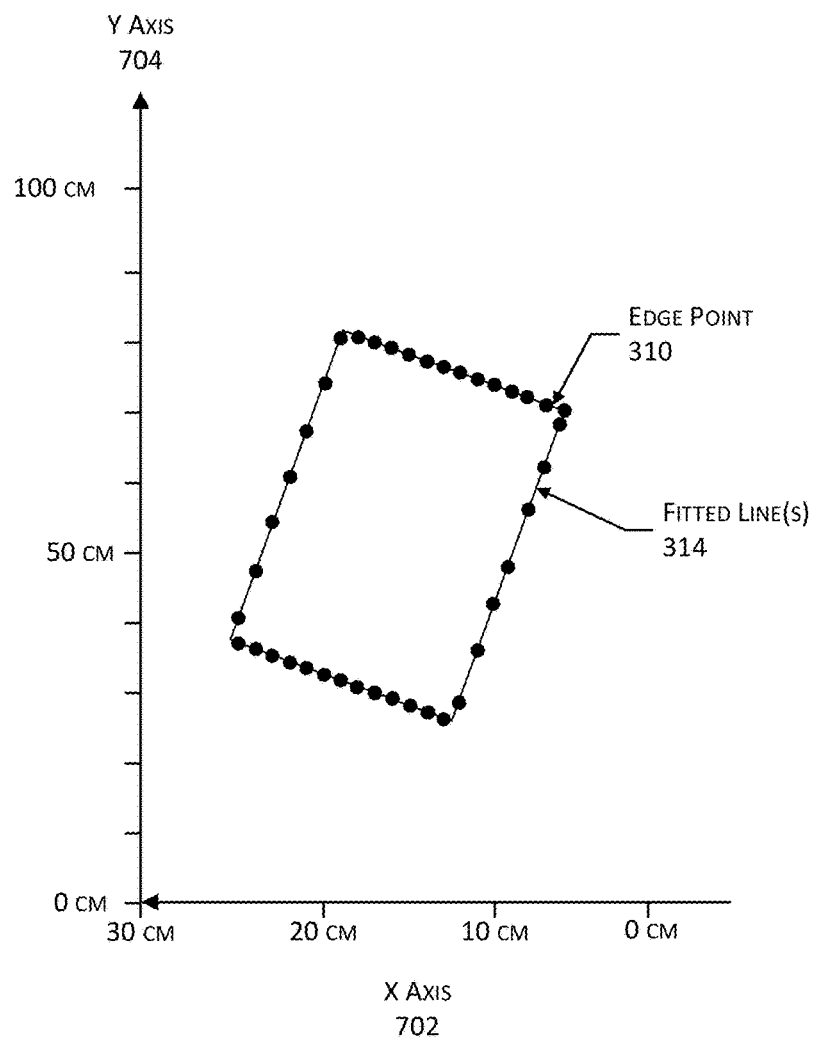
FIG. 7 is a plot of the edge points and fitted lines corresponding to the edge points, according to one implementation.

FIG. 7 is plot 700 of the edge points 310 and fitted lines 314 corresponding to the edge points 310, according to one implementation. In this illustration, a horizontal axis 702 is indicative of locations along the X axis while a vertical axis 704 is indicative of locations along the Y axis. The edge points 310 are shown, and the line fitting module 312 has been used to determine the fitted lines 314 that correspond to the edge points 310. The fitted lines 314 may, but need not always, pass through the edge points 310. In some situations, outliers or erroneous readings may result in a fitted line 314 that does not intersect one or more edge points 310.

The footprint data 136 may be indicative of the fitted lines 314, one or more polygons, edge points 310, and so forth. The fitted lines 314 in this illustration describe the boundary of the item 108 proximate to the surface 404 during scanning.

In some implementations, the footprint data 136 may include height data. For example, an overhead ultrasonic sensor may provide data indicative of a height of the item 108.

Figure 8:
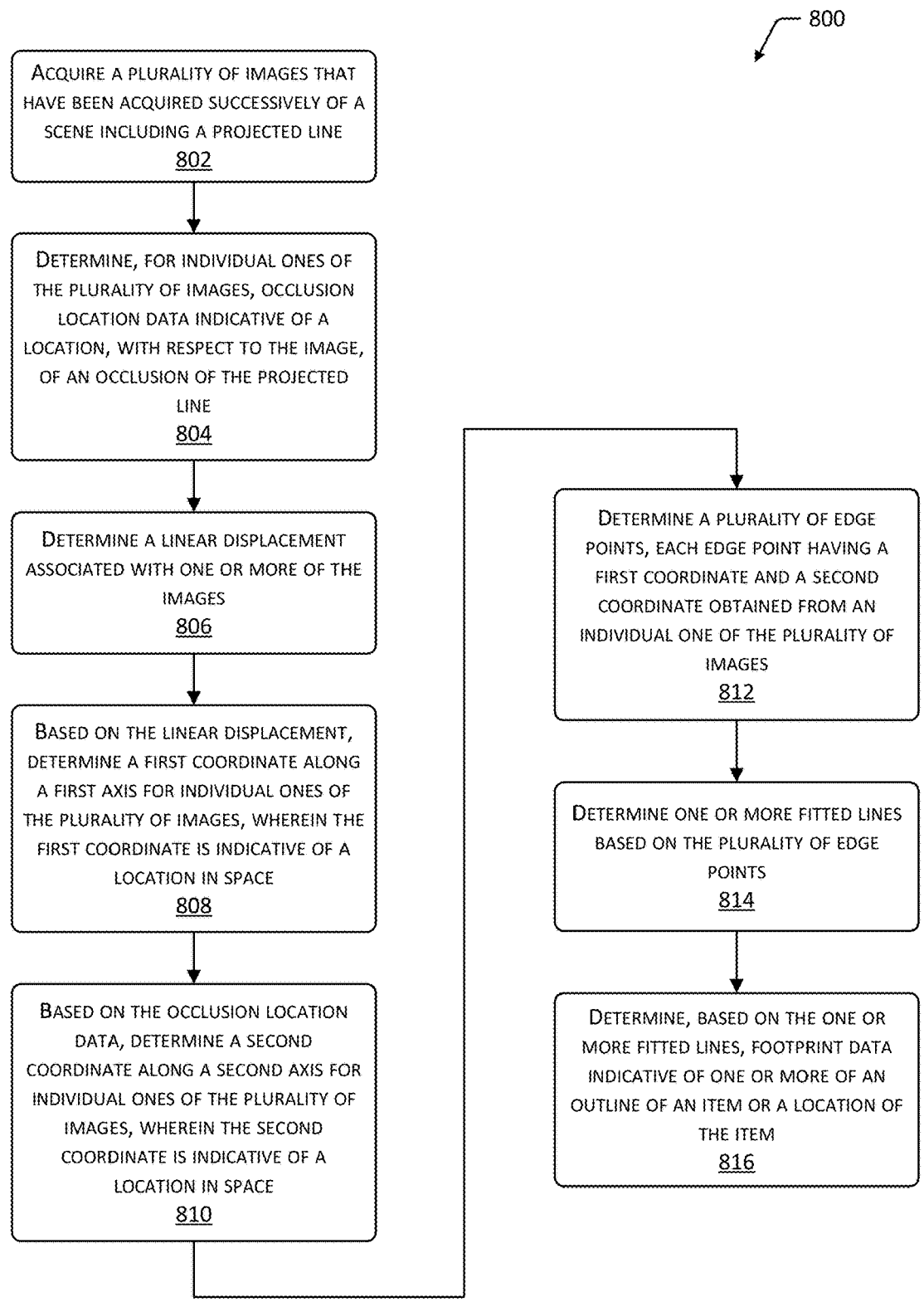
FIG. 8 depicts a flow diagram of a process of determining footprint data using occlusion of projected lines, according to some implementations.

FIG. 8 depicts a flow diagram 800 of a process of determining footprint data 136 using occlusion of projected lines, according to some implementations. The process may be implemented at least in part by the footprint module 132.

At 802, a plurality of images 126 of a projected line 114 are acquired of a scene. For example, successive images 126 may be obtained of the measurement area 110 within which a projected line is depicted.

At 804, for individual ones of the plurality of images 126, occlusion location data 306 is determined. For example, the occlusion location detection module 302 described above with regard to FIG. 3 may determine the coordinates within the image 126 at which a feature change in the projected line 114 is determined that is representative of an occlusion of the projected line 114 by the item 108.

At 806, a linear displacement value associated with one or more of the images 126 may be determined. For example, the linear motion data 134 may be acquired that indicates the motion of the conveyor belt 102, or other motion of the surface 404 upon which the item 108 is supported during scanning.

At 808, based on the linear displacement value, a first coordinate along a first axis is determined for individual ones of the plurality of images 126. For example, given the timestamp 128 value, the X axis coordinate of an edge point 310 may be determined as described above with regard to FIG. 6. The X axis coordinate may be indicative of a location in space, such as a distance along a lateral edge of the conveyor belt 102.

At 810, based on the occlusion location data 306, a second coordinate along a second axis is determined for individual ones of the plurality of images 126. For example, the Y axis coordinate 608 may be determined by the transform module 606 of the coordinate mapping module 308. As described above, the transform module 606 may determine a transform that associates a particular location in an image 126, such as the coordinates of a pixel in the image 126, with a particular location along the Y axis in space. Continuing the example, the Y axis coordinate 608 may be indicative of a location in space at a given distance perpendicular to a particular lateral edge of the conveyor belt 102.

At 812, a plurality of edge points 310 are determined. For example, one edge point 310 may be determined for each image 126 in which an occlusion of the projected line 114 is determined.

At 814, one or more fitted lines 314 are determined based on the plurality of edge points 310. For example, a damped least-squares algorithm, also known as the Levenberg-Marquardt algorithm, may be used to fit a line to one or more of the edge points 310. In other implementations, other techniques may be used.

At 816, based on the one or more fitted lines 314, footprint data 136 is determined. The footprint data 136 may be indicative of an outline of an item 108, a location of the item 108, the dimensions of the item 108 based on the outline, and so forth. For example, in some implementations the footprint data 136 may include a calculated centroid value that is indicative of a centroid for a closed polygon described by the fitted lines 314.

In some implementations, the footprint data 136 may then be used for other operations. For example, the footprint data 136 may be compared with previously stored data to determine the type of the item 108. In another example, the footprint data 136 may be used to determine instructions to control another device such as the tool 122.

Figure 9:
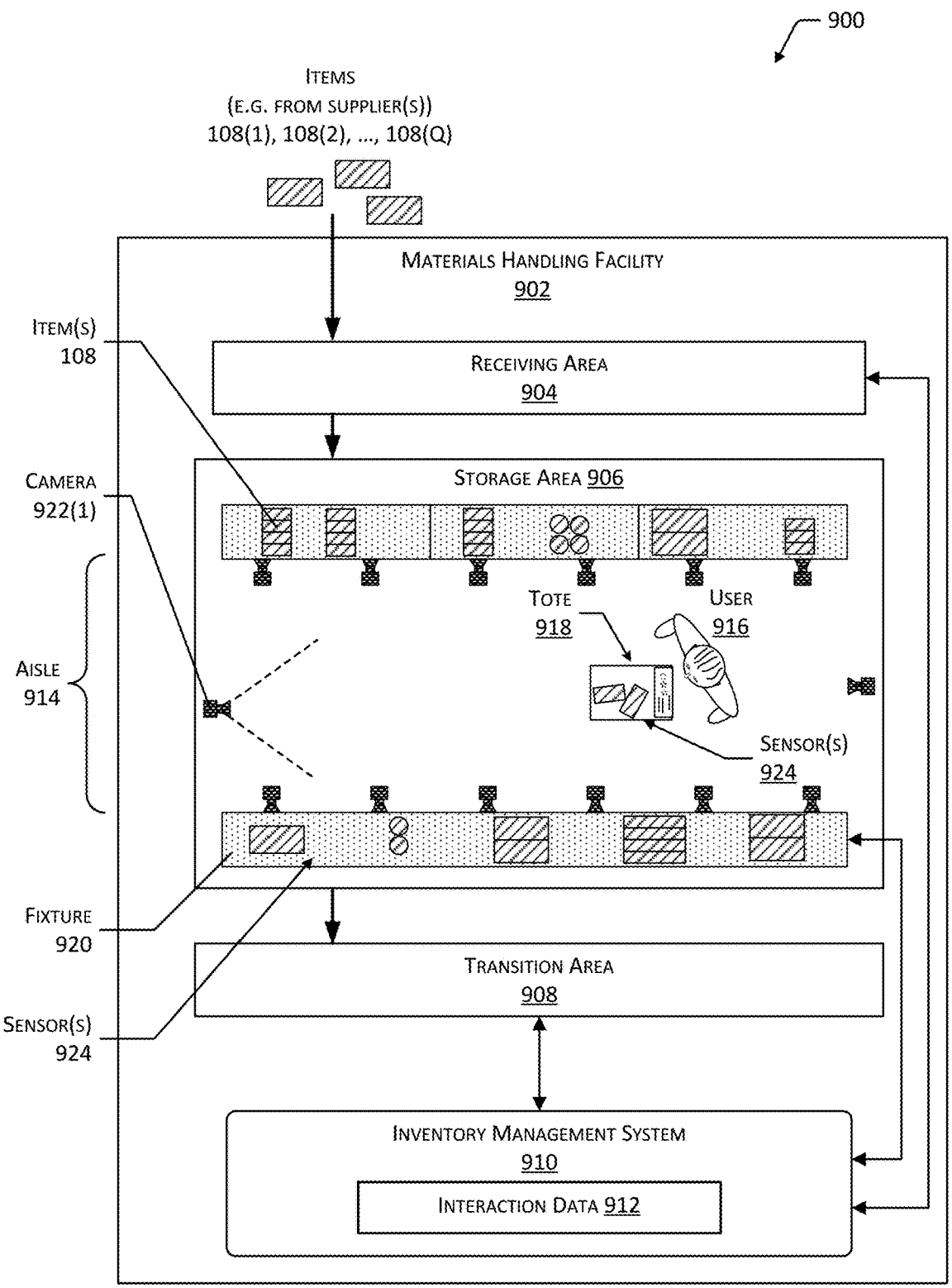
FIG. 9 is a block diagram of a materials handling facility (facility), according to some implementations.

FIG. 9 is a block diagram 900 illustrating a materials handling facility (facility) 902 using the system 100, according to some implementations. A facility 902 comprises one or more physical structures or areas within which one or more items 108(1), 108(2), . . . , 108(Q) may be held. As used in this disclosure, letters in parenthesis such as "(Q)" indicate an integer value greater than or equal to zero. The items 108 may comprise physical goods, such as books, pharmaceuticals, repair parts, electronic gear, and so forth.

The facility 902 may include one or more areas designated for different functions with regard to inventory handling. In this illustration, the facility 902 includes a receiving area 904, a storage area 906, and a transition area 908.

The receiving area 904 may be configured to accept items 108, such as from suppliers, for intake into the facility 902. For example, the receiving area 904 may include a loading dock at which trucks or other freight conveyances unload the items 108. In some implementations, the items 108 may be processed at the receiving area 904, to generate at least a portion of item data. For example, the item 108 may be scanned using the system 100 to generate footprint data 136 about the item 108 at the receiving area 904.

The storage area 906 is configured to store the items 108. The storage area 906 may be arranged in various physical configurations. In one implementation, the storage area 906 may include one or more aisles 914. The aisle 914 may be configured with, or defined by, fixtures 920 on one or both sides of the aisle 914.

One or more users 916 and totes 918 or other material handling apparatuses may move within the facility 902. For example, the user 916 may move about within the facility 902 to pick or place the items 108 in various fixtures 920, placing them on the tote 918 for ease of transport. The tote 918 is configured to carry or otherwise transport one or more items 108. For example, the tote 918 may include a basket, cart, bag, bin, and so forth. In other implementations, other material handling apparatuses such as robots, forklifts, cranes, aerial drones, and so forth, may move about the facility 902 picking, placing, or otherwise moving the items

108. For example, a robot may pick an item 108 from a first fixture 920(1) and move the item 108 to a second fixture 920(2).

One or more sensors 924 may be configured to acquire information in the facility 902. The sensors 924 may include, but are not limited to, cameras 922, depth sensors 924(2), weight sensors 924(6), optical sensor arrays 924(13), proximity sensors 924(14), and so forth. The sensors 924 may be stationary or mobile, relative to the facility 902. For example, the fixtures 920 may contain weight sensors 924(6) to acquire weight sensor data of items 108 stowed therein, cameras 922 to acquire images of picking or placement of items 108 on shelves, optical sensor arrays 924(13) to detect shadows of the user's hands at the fixtures 920, and so forth. In another example, the facility 902 may include cameras 922 to obtain images of the user 916 or other objects in the facility 902. The sensors 924 are discussed in more detail below with regard to FIG. 10.

While the storage area 906 is depicted as having a single aisle 914, fixtures 920 storing the items 108, sensors 924, and so forth, it is understood that the receiving area 904, the transition area 908, or other areas of the facility 902 may be similarly equipped. Furthermore, the arrangement of the various areas within the facility 902 is depicted functionally rather than schematically. For example, in some implementations, multiple different receiving areas 904, storage areas 906, and transition areas 908 may be interspersed rather than segregated in the facility 902.

The facility 902 may include, or be coupled to, an inventory management system 910. The inventory management system 910 is configured to interact with users 916 or devices such as sensors 924, robots, material handling equipment, computing devices, and so forth, in one or more of the receiving area 904, the storage area 906, or the transition area 908.

During operation of the facility 902, the sensors 924 may be configured to provide sensor data, or information based on the sensor data, to the inventory management system 910. The sensor data may include image data obtained from cameras 922, weight sensor data obtained from weight sensors 924(6), and so forth.

The inventory management system 910 or other systems may use the sensor data to track the location of objects within the facility 902, movement of the objects, or provide other functionality. Objects may include, but are not limited to, items 108, users 916, totes 918, and so forth. For example, the image data acquired by the camera 922 may indicate removal by the user 916 of an item 108 from a particular location on the fixture 920 and placement of the item 108 on or at least partially within the tote 918.

The facility 902 may be configured to receive different kinds of items 108 from various suppliers and to store them until a customer orders or retrieves one or more of the items 108. A general flow of items 108 through the facility 902 is indicated by the arrows of FIG. 9. Specifically, as illustrated in this example, items 108 may be received from one or more suppliers, such as manufacturers, distributors, wholesalers, and so forth, at the receiving area 904. In various implementations, the items 108 may include merchandise, commodities, perishables, or any suitable type of item 108, depending on the nature of the enterprise that operates the facility 902.

Upon being received from a supplier at the receiving area 904, the items 108 may be prepared for storage in the storage area 906. For example, in some implementations, items 108 may be unpacked or otherwise rearranged. The inventory management system 910 may include one or more software applications executing on a computer system to provide inventory management functions. These inventory management functions may include maintaining information indicative of the type, quantity, condition, cost, location, weight, or any other suitable parameters with respect to the items 108. The items 108 may be stocked, managed, or dispensed in terms of countable units, individual units, or multiple units, such as packages, cartons, crates, pallets, or other suitable aggregations. Alternatively, some items 108, such as bulk products, commodities, and so forth, may be stored in continuous or arbitrarily divisible amounts that may not be inherently organized into countable units. Such items 108 may be managed in terms of a measurable quantity such as units of length, area, volume, weight, time, duration, or other dimensional properties characterized by units of measurement. Generally speaking, a quantity of an item 108 may refer to either a countable number of individual or aggregate units of an item 108 or a measurable amount of an item 108, as appropriate.

After arriving through the receiving area 904, items 108 may be stored within the storage area 906. In some implementations, like items 108 may be stored or displayed together in the fixtures 920 such as in bins, on shelves, hanging from pegboards, and so forth. In this implementation, all items 108 of a given kind are stored in one fixture 920. In other implementations, like items 108 may be stored in different fixtures 920. For example, to optimize retrieval of certain items 108 having frequent turnover within a large physical facility 902, those items 108 may be stored in several different fixtures 920 to reduce congestion that might occur at a single fixture 920.

When a customer order specifying one or more items 108 is received, or as a user 916 progresses through the facility 902, the corresponding items 108 may be selected or "picked" from the fixtures 920 containing those items 108. In various implementations, item picking may range from manual to completely automated picking. For example, in one implementation, a user 916 may have a list of items 108 they desire and may progress through the facility 902 picking items 108 from fixtures 920 within the storage area 906 and placing those items 108 into a tote 918. In other implementations, employees of the facility 902 may pick items 108 using written or electronic pick lists derived from customer orders. These picked items 108 may be placed into the tote 918 as the employee progresses through the facility 902.

After items 108 have been picked, the items 108 may be processed at a transition area 908. The transition area 908 may be any designated area within the facility 902 where items 108 are transitioned from one location to another or from one entity to another. For example, the transition area 908 may be a packing station within the facility 902. When the item 108 arrives at the transition area 908, the items 108 may be transitioned from the storage area 906 to the packing station. Information about the transition may be maintained by the inventory management system 910.

In another example, if the items 108 are departing the facility 902, a list of the items 108 may be obtained and used by the inventory management system 910 to transition responsibility for, or custody of, the items 108 from the facility 902 to another entity. For example, a carrier may accept the items 108 for transport with that carrier accepting responsibility for the items 108 indicated in the list. In another example, a user 916 may purchase or rent the items 108 and remove the items 108 from the facility 902. During use of the facility 902, the user 916 may move about the facility 902 to perform various tasks, such as picking or placing the items 108 in the fixtures 920.

To facilitate operation of the facility 902, the inventory management system 910 is configured to use the sensor data to generate interaction data 912. For example, tracking data may be used to associate a particular pick of an item 108 at a particular fixture 920 with a particular user ID.

The interaction data 912 may provide information about an interaction, such as a pick of an item 108 from the fixture 920, a place of an item 108 to the fixture 920, a touch made to an item 108 at the fixture 920, a gesture associated with an item 108 at the fixture 920, and so forth. The interaction data 912 may include one or more of the type of interaction, interaction location identifier indicative of where from the fixture 920 the interaction took place, item identifier, quantity change to the item 108, user ID, and so forth. The interaction data 912 may then be used to further update the item data. For example, the quantity of items 108 on hand at a particular lane a the shelf may be changed based on an interaction that picks or places one or more items 108.

The inventory management system 910 may combine or otherwise utilize data from different sensors 924 of different types to generate the interaction data 912. For example, weight data obtained from weight sensors 924(6) at the fixture 920 may be used instead of, or in conjunction with, the image data to determine the interaction data 912.

Figure 10:
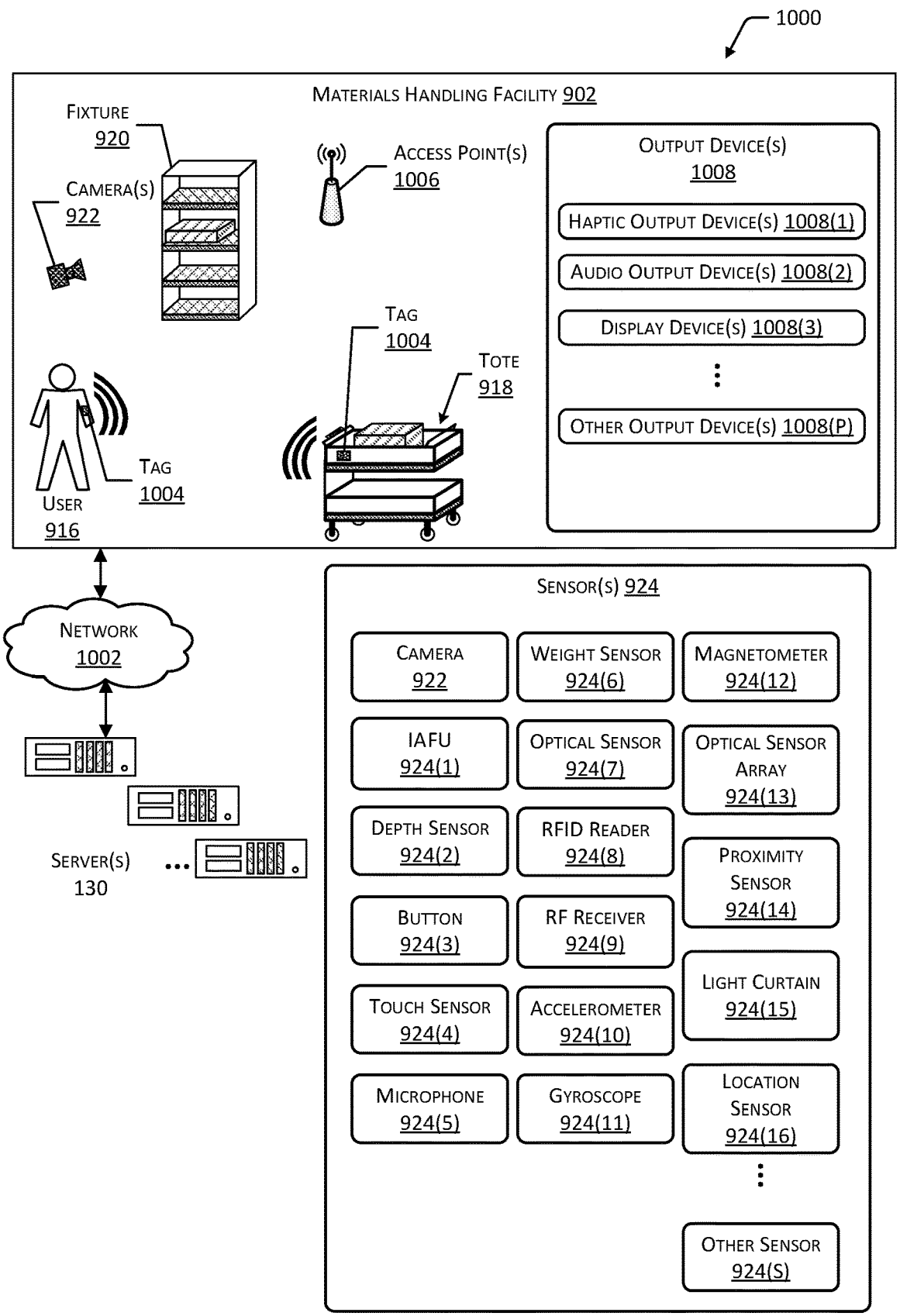
FIG. 10 is a block diagram illustrating additional details of the facility, according to some implementations.

FIG. 10 is a block diagram 1000 illustrating additional details of the facility 902, according to some implementations. The facility 902 may be connected to one or more networks 1002, which in turn connect to one or more servers 130. The network 1002 may include private networks such as an institutional or personal intranet, public networks such as the Internet, or a combination thereof. The network 1002 may utilize wired technologies (e.g., wires, fiber optic cables, and so forth), wireless technologies (e.g., radio frequency, infrared, acoustic, optical, and so forth), or other connection technologies. The network 1002 is representative of any type of communication network, including one or more of data networks or voice networks. The network 1002 may be implemented using wired infrastructure (e.g., copper cable, fiber optic cable, and so forth), a wireless infrastructure (e.g., cellular, microwave, satellite, and so forth), or other connection technologies.

The servers 130 may be configured to execute one or more modules or software applications associated with the inventory management system 910 or other systems. While the servers 130 are illustrated as being in a location outside of the facility 902, in other implementations, at least a portion of the servers 130 may be located at the facility 902. The servers 130 are discussed in more detail below with regard to FIG. 11.

The users 916, the totes 918, or other objects in the facility 902 may be equipped with one or more tags 1004. The tags 1004 may be configured to emit a signal. In one implementation, the tag 1004 may be a radio frequency identification (RFID) tag 1004 configured to emit an RF signal upon activation by an external signal. For example, the external signal may comprise a radio frequency signal or a magnetic field configured to energize or activate the RFID tag 1004. In another implementation, the tag 1004 may comprise a transmitter and a power source configured to power the transmitter. For example, the tag 1004 may comprise a Bluetooth Low Energy (BLE) transmitter and battery. In other implementations, the tag 1004 may use other techniques to indicate presence of the tag 1004. For example, an acoustic tag 1004 may be configured to generate an ultrasonic signal, which is detected by corresponding acoustic receivers. In yet another implementation, the tag 1004 may be configured to emit an optical signal.

The inventory management system 910 may be configured to use the tags 1004 for one or more of identification of the object, determining a location of the object, and so forth. For example, the users 916 may wear tags 1004, the totes 918 may have tags 1004 affixed, and so forth, which may be read and, based at least in part on signal strength, used to determine identity and location.

Generally, the inventory management system 910 or other systems associated with the facility 902 may include any number and combination of input components, output components, and servers 130.

The one or more sensors 924 may be arranged at one or more locations within the facility 902. For example, the sensors 924 may be mounted on or within a floor, wall, at a ceiling, at a fixture 920, on a tote 918, may be carried or worn by a user 916, and so forth.

The sensors 924 may include an instrumented auto-facing unit (IAFU) 924(1). The IAFU 924(1) may comprise a position sensor or encoder configured to provide data indicative of displacement of a pusher. As an item 108 is removed from the IAFU 924(1), the pusher moves, such as under the influence of a spring, and pushes the remaining items 108 in the IAFU 924(1) to the front of the fixture 920. By using data from the position sensor, and given item data such as a depth of an individual item 108, a count may be determined, based on a change in position data. For example, if each item 108 is 1 inch deep, and the position data indicates a change of 10 inches, the quantity held by the IAFU 924(1) may have changed by 10 items 108. This count information may be used to confirm or provide a cross check for a count obtained by other means, such as analysis of the image data.

The sensors 924 may include one or more cameras 922 or other imaging sensors. The one or more cameras 922 may include imaging sensors configured to acquire images of a scene. The cameras 922 are configured to detect light in one or more wavelengths including, but not limited to, terahertz, infrared, visible, ultraviolet, and so forth. The cameras 922 may comprise charge coupled devices (CCD), complementary metal oxide semiconductor (CMOS) devices, microbolometers, and so forth. The inventory management system 910 may use image data acquired by the cameras 922 during operation of the facility 902. For example, the inventory management system 910 may identify items 108, users 916, totes 918, and so forth, based at least in part on their appearance within the image data acquired by the cameras 922. The cameras 922 may be mounted in various locations within the facility 902. For example, cameras 922 may be mounted overhead, on fixtures 920, may be worn or carried by users 916, may be affixed to totes 918, and so forth.

One or more depth sensors 924(2) may also be included in the sensors 924. The depth sensors 924(2) are configured to acquire spatial or three-dimensional (3D) data, such as depth information, about objects within a field-of-view. The depth sensors 924(2) may include range cameras, lidar systems, sonar systems, radar systems, structured light systems, stereo vision systems, optical interferometry systems, and so forth. The inventory management system 910 may use the 3D data acquired by the depth sensors 924(2) to identify objects, determine a location of an object in 3D real space, and so forth.

One or more buttons 924(3) may be configured to accept input from the user 916. The buttons 924(3) may comprise mechanical, capacitive, optical, or other mechanisms. For example, the buttons 924(3) may comprise mechanical switches configured to accept an applied force from a touch of the user 916 to generate an input signal. The inventory management system 910 may use data from the buttons 924(3) to receive information from the user 916. For example, the tote 918 may be configured with a button 924(3) to accept input from the user 916 and send information indicative of the input to the inventory management system 910.

The sensors 924 may include one or more touch sensors 924(4). The touch sensors 924(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 910 may use data from the touch sensors 924(4) to receive information from the user 916. For example, the touch sensor 924(4) may be integrated with the tote 918 to provide a touchscreen with which the user 916 may select from a menu one or more particular items 108 for picking, enter a manual count of items 108 at a fixture 920, and so forth.

One or more microphones 924(5) or other acoustic transducers may be configured to acquire information indicative of sound present in the environment. In some implementations, arrays of microphones 924(5) may be used. These arrays may implement beamforming techniques to provide for directionality of gain. The inventory management system 910 may use the one or more microphones 924(5) to acquire information from acoustic tags 1004, accept voice input from the users 916, determine ambient noise level, and so forth.

One or more weight sensors 924(6) are configured to measure the weight of a load, such as the item 108, the tote 918, or other objects. The weight sensors 924(6) may be configured to measure the weight of the load at one or more of the fixtures 920, the tote 918, on the floor of the facility 902, and so forth. For example, the shelf may include a plurality of lanes or platforms, with one or more weight sensors 924(6) beneath each one to provide weight sensor data about an individual lane or platform. The weight sensors 924(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 924(6) may operate as transducers that generate one or more signals based on an applied force, such as that of the load due to gravity. For example, the weight sensor 924(6) may comprise a load cell having a strain gauge and a structural member that deforms slightly when weight is applied. By measuring a change in the electrical characteristic of the strain gauge, such as capacitance or resistance, the weight may be determined. In another example, the weight sensor 924(6) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 910 may use the data acquired by the weight sensors 924(6) to identify an object, determine a change in the quantity of objects, determine a location of an object, maintain shipping records, and so forth.

The sensors 924 may include one or more optical sensors 924(7). The optical sensors 924(7) may be configured to provide data indicative of one or more of color or intensity of light impinging thereupon. For example, the optical sensor 924(7) may comprise a photodiode and associated circuitry configured to generate a signal or data indicative of an incident flux of photons. As described below, the optical sensor array 924(13) may comprise a plurality of the optical sensors 924(7). For example, the optical sensor array 924(13) may comprise an array of ambient light sensors such as the ISL76683 as provided by Intersil Corporation of Milpitas, Calif., USA, or the MAX44009 as provided by Maxim Integrated of San Jose, Calif., USA. In other implementations, other optical sensors 924(7) may be used. The optical sensors 924(7) may be sensitive to one or more of infrared light, visible light, or ultraviolet light. The optical sensors 924(7) may include photodiodes, photoresistors, photovoltaic cells, quantum dot photoconductors, bolometers, pyroelectric infrared detectors, and so forth. For example, the optical sensor 924(7) may use germanium photodiodes to detect infrared light.

One or more radio frequency identification (RFID) readers 924(8), near field communication (NFC) systems, and so forth, may be included as sensors 924. For example, the RFID readers 924(8) may be configured to read the RF tags 1004. Information acquired by the RFID reader 924(8) may be used by the inventory management system 910 to identify an object associated with the RF tag 1004 such as the item 108, the user 916, the tote 918, and so forth. For example, based on information from the RFID readers 924(8) detecting the RF tag 1004 at different times and RFID readers 924(8) having different locations in the facility 902, a velocity of the RF tag 1004 may be determined.

One or more RF receivers 924(9) may also be included as sensors 924. In some implementations, the RF receivers 924(9) may be part of transceiver assemblies. The RF receivers 924(9) may be configured to acquire RF signals associated with Wi-Fi, Bluetooth, ZigBee, 3G, 4G, LTE, or other wireless data transmission technologies. The RF receivers 924(9) may provide information associated with data transmitted via radio frequencies, signal strength of RF signals, and so forth. For example, information from the RF receivers 924(9) may be used by the inventory management system 910 to determine a location of an RF source, such as a communication interface onboard the tote 918.

The sensors 924 may include one or more accelerometers 924(10), which may be worn or carried by the user 916, mounted to the tote 918, and so forth. The accelerometers 924(10) may provide information such as the direction and magnitude of an imposed acceleration. Data such as rate of acceleration, determination of changes in direction, speed, and so forth, may be determined using the accelerometers 924(10).

A gyroscope 924(11) may provide information indicative of rotation of an object affixed thereto. For example, the tote 918 or other objects may be equipped with a gyroscope 924(11) to provide data indicative of a change in orientation of the object.

A magnetometer 924(12) may be used to determine an orientation by measuring ambient magnetic fields, such as the terrestrial magnetic field. The magnetometer 924(12) may be worn or carried by the user 916, mounted to the tote 918, and so forth. For example, the magnetometer 924(12) mounted to the tote 918 may act as a compass and provide information indicative of which direction the tote 918 is oriented.

An optical sensor array 924(13) may comprise one or more optical sensors 924(7). The optical sensors 924(7) may be arranged in a regular, repeating, or periodic two-dimensional arrangement such as a grid. The optical sensor array 924(13) may generate image data. For example, the optical sensor array 924(13) may be arranged within or below a fixture 920 and obtain information about shadows of items 108, hand of the user 916, and so forth.

The sensors 924 may include proximity sensors 924(14) used to determine presence of an object, such as the user 916, the tote 918, and so forth. The proximity sensors 924(14) may use optical, electrical, ultrasonic, electromagnetic, or other techniques to determine a presence of an object. In some implementations, the proximity sensors 924(14) may use an optical emitter and an optical detector to determine proximity. For example, an optical emitter may emit light, a portion of which may then be reflected by the object back to the optical detector to provide an indication that the object is proximate to the proximity sensor 924(14). In other implementations, the proximity sensors 924(14) may comprise a capacitive proximity sensor 924(14) configured to provide an electrical field and determine a change in electrical capacitance due to presence or absence of an object within the electrical field.

The proximity sensors 924(14) may be configured to provide sensor data indicative of one or more of a presence or absence of an object, a distance to the object, or characteristics of the object. An optical proximity sensor 924(14) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 924 such as a camera 922. Based on an apparent distance between the features of the structured light pattern, the distance to the object may be calculated. Other techniques may also be used to determine distance to the object. In another example, the color of the reflected light may be used to characterize the object, such as skin, clothing, tote 918, and so forth.

The sensors 924 may include a light curtain 924(15) that utilizes a linear array of light emitters and a corresponding linear array of light detectors. For example, the light emitters may comprise a line of infrared light emitting diodes (LEDs) or vertical cavity surface emitting lasers (VCSELs) that are arranged above a top shelf in front of the fixture 920, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 916 hand would prevent at least some of the light from light emitters from reaching a corresponding light detector. As a result, a position along the linear array of the object may be determined that is indicative of a touchpoint. This position may be expressed as touchpoint data, with the touchpoint being indicative of the intersection between the hand of the user 916 and the sheet of infrared light. In some implementations, a pair of light curtains 924(15) may be arranged at right angles relative to one another to provide two-dimensional touchpoint data indicative of a position of touch in a plane. Input from the light curtain 924(15), such as indicating occlusion from a hand of a user 916 may be used to trigger acquisition or selection of image data for processing by the inventory management system 910.

A location sensor 924(16) may be configured to provide information such as geographic coordinates, speed, heading, and so forth. The location sensor 924(16) may comprise a radio navigation-based system, such as a terrestrial or satellite-based navigational system. Satellite-based navigational systems may include a GPS receiver, a Global Navigation Satellite System (GLONASS) receiver, a Galileo receiver, a BeiDou Navigation Satellite System (BDS) receiver, an Indian Regional Navigational Satellite System, and so forth.

The sensors 924 may include other sensors 924(S) as well. For example, the other sensors 924(S) may include ultrasonic rangefinders, thermometers, barometric sensors, hygrometers, and so forth. For example, the inventory management system 910 may use information acquired from thermometers and hygrometers in the facility 902 to direct the user 916 to check on delicate items 108 stored in a particular fixture 920, which is overheating, too dry, too damp, and so forth.

In some implementations, the camera 922 or other sensors 924(S) may include hardware processors, memory, and other elements configured to perform various functions. For example, the cameras 922 may be configured to generate image data, send the image data to another device such as the server 130, and so forth.

The facility 902 may include one or more access points 1006 configured to establish one or more wireless networks. The access points 1006 may use Wi-Fi, NFC, Bluetooth, or other technologies to establish wireless communications between a device and the network 1002. The wireless networks allow the devices to communicate with one or more of the sensors 924, the inventory management system 910, the optical sensor arrays 924(13), the tags 1004, a communication device of the tote 918, or other devices.

Output devices 1008 may also be provided in the facility 902. The output devices 1008 are configured to generate signals, which may be perceived by the user 916 or detected by the sensors 924. In some implementations, the output devices 1008 may be used to provide illumination of the optical sensor array 924(13), light curtain 924(15), and so forth.

Haptic output devices 1008(1) are configured to provide a signal that results in a tactile sensation to the user 916. The haptic output devices 1008(1) may use one or more mechanisms such as electrical stimulation or mechanical displacement to provide the signal. For example, the haptic output devices 1008(1) may be configured to generate a modulated electrical signal, which produces an apparent tactile sensation in one or more fingers of the user 916. In another example, the haptic output devices 1008(1) may comprise piezoelectric or rotary motor devices configured to provide a vibration, which may be felt by the user 916.

One or more audio output devices 1008(2) may be configured to provide acoustic output. The acoustic output includes one or more of infrasonic sound, audible sound, or ultrasonic sound. The audio output devices 1008(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output. In another example, a location of a mobile device in the facility 902 may be determined based on device data indicative of ultrasonic sound emitted by audio output devices 1008(2) positioned within the facility 902.

Display devices 1008(3) may be configured to provide output, which may be seen by the user 916 or detected by a light-sensitive sensor such as a camera 922 or an optical sensor 924(7). In some implementations, the display devices 1008(3) may be configured to produce output in one or more of infrared, visible, or ultraviolet light. The output may be monochrome or in color. The display devices 1008(3) may be one or more of emissive, reflective, microelectromechanical, and so forth. An emissive display device 1008(3), such as using LEDs, is configured to emit light during operation. In comparison, a reflective display device 1008(3), such as using an electrophoretic element, relies on ambient light to present an image. Backlights or front lights may be used to illuminate non-emissive display devices 1008(3) to provide visibility of the output in conditions where the ambient light levels are low.

The display devices 1008(3) may be located at various points within the facility 902. For example, the addressable displays may be located on fixtures 920, totes 918, on the floor of the facility 902, and so forth.

Other output devices 1008(P) may also be present. For example, the other output devices 1008(P) may include scent/odor dispensers, document printers, 3D printers or fabrication equipment, and so forth.

Figure 11:
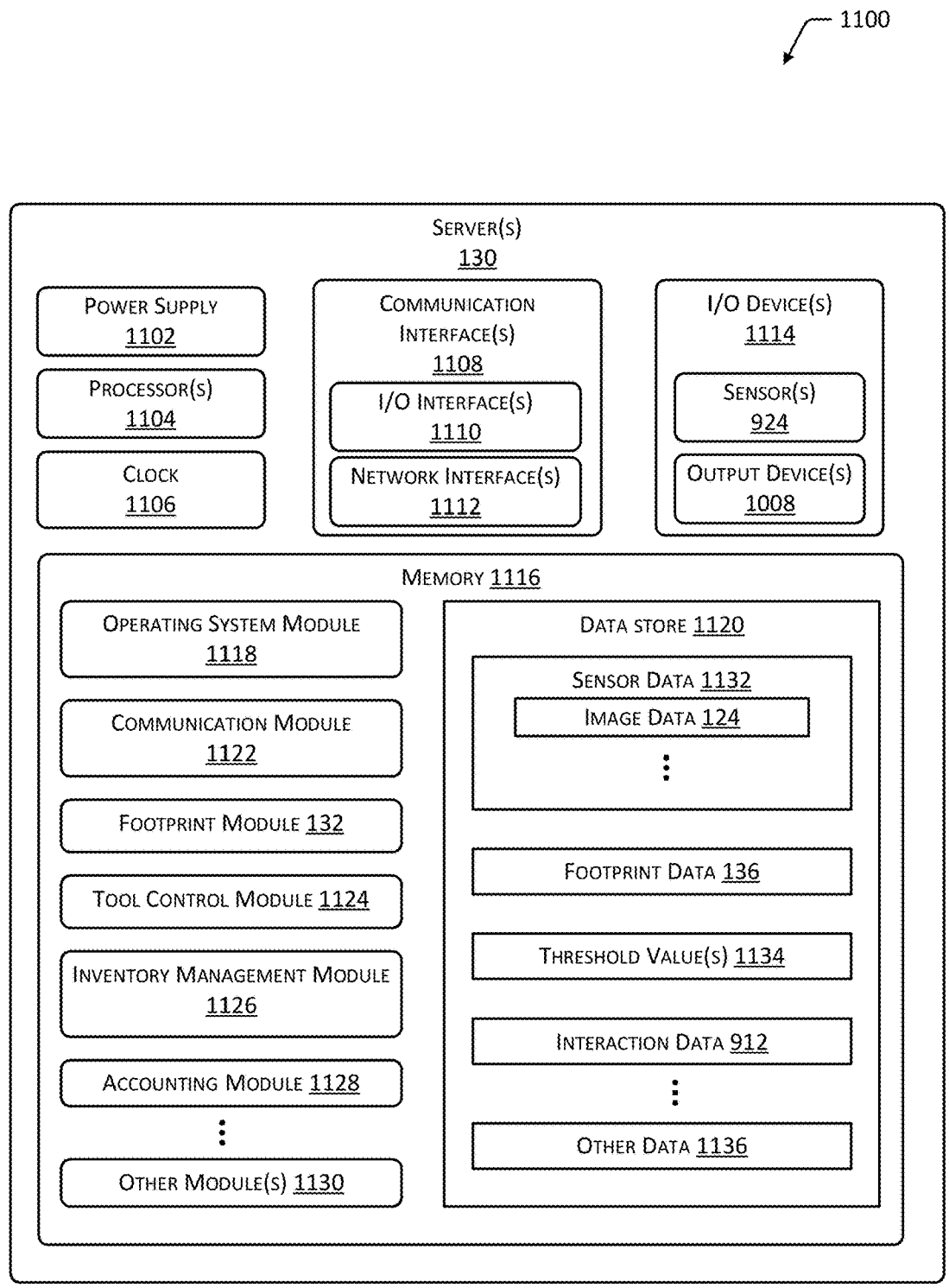
FIG. 11 illustrates a block diagram of a server configured to support operation of the facility, according to some implementations.

FIG. 11 illustrates a block diagram 1100 of a server 130 configured to support operation of the facility 902, according to some implementations. The server 130 may be physically present at the facility 902, may be accessible by the network 1002, or a combination of both. The server 130 does not require end-user knowledge of the physical location and configuration of the system that delivers the services. Common expressions associated with the server 130 may include "on-demand computing", "software as a service (SaaS)", "platform computing", "network-accessible platform", "cloud services", "data centers", and so forth. Services provided by the server 130 may be distributed across one or more physical or virtual devices.

One or more power supplies 1102 may be configured to provide electrical power suitable for operating the components in the server 130. The one or more power supplies 1102 may comprise batteries, capacitors, fuel cells, photovoltaic cells, wireless power receivers, conductive couplings suitable for attachment to an external power source such as provided by an electric utility, and so forth. The server 130 may include one or more hardware processors 1104 (processors) configured to execute one or more stored instructions. The processors 1104 may comprise one or more cores. One or more clocks 1106 may provide information indicative of date, time, ticks, and so forth. For example, the processor 1104 may use data from the clock 1106 to associate a particular interaction with a particular point in time.

The server 130 may include one or more communication interfaces 1108 such as input/output (I/O) interfaces 1110, network interfaces 1112, and so forth. The communication interfaces 1108 enable the server 130, or components thereof, to communicate with other devices or components. The communication interfaces 1108 may include one or more I/O interfaces 1110. The I/O interfaces 1110 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1110 may couple to one or more I/O devices 1114. The I/O devices 1114 may include input devices such as one or more of a sensor 924, keyboard, mouse, scanner, and so forth. The I/O devices 1114 may also include output devices 1008 such as one or more of a display device 1008(3), printer, audio speakers, and so forth. In some embodiments, the I/O devices 1114 may be physically incorporated with the server 130 or may be externally placed.

The network interfaces 1112 may be configured to provide communications between the server 130 and other devices, such as the totes 918, routers, access points 1006, and so forth. The network interfaces 1112 may include devices configured to couple to personal area networks (PANs), local area networks (LANs), wireless local area networks (WLANS), wide area networks (WANs), and so forth. For example, the network interfaces 1112 may include devices compatible with Ethernet, Wi-Fi, Bluetooth, ZigBee, and so forth.

The server 130 may also include one or more busses or other internal communications hardware or software that allow for the transfer of data between the various modules and components of the server 130.

As shown in FIG. 11, the server 130 includes one or more memories 1116. The memory 1116 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1116 provides storage of computer-readable instructions, data structures, program modules, and other data for the operation of the server 130. A few example functional modules are shown stored in the memory 1116, although the same functionality may alternatively be implemented in hardware, firmware, or as a system on a chip (SoC).

The memory 1116 may include at least one operating system (OS) module 1118. The OS module 1118 is configured to manage hardware resource devices such as the I/O interfaces 1110, the I/O devices 1114, the communication interfaces 1108, and provide various services to applications or modules executing on the processors 1104. The OS module 1118 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 1116 may be a data store 1120 and one or more of the following modules. These modules may be executed as foreground applications, background tasks, daemons, and so forth. The data store 1120 may use a flat file, database, linked list, tree, executable code, script, or other data structure to store information. In some implementations, the data store 1120 or a portion of the data store 1120 may be distributed across one or more other devices including the servers 130, network attached storage devices, and so forth.

A communication module 1122 may be configured to establish communications with one or more of other servers 130, mobile devices, the totes 918, sensors 924, or other devices. The communications may be authenticated, encrypted, and so forth.

The memory 1116 may store the footprint module 132. The functions of the footprint module 132 are discussed above.

The memory 1116 may store a tool control module 1124. The tool control module 1124 may be configured to generate instruction to control the tool 122. For example, the tool control module 1124 may use the footprint data 136 to determine the location of one or more sides of the item 108 to use in positioning the tool 122. Continuing the example, the tool 122 may comprise a continuous inkjet printer that is used to apply one or more machine-readable markings on the item 108.

The memory 1116 may also store an inventory management module 1126. The inventory management module 1126 is configured to provide the inventory functions as described herein with regard to the inventory management system 910. For example, the inventory management module 1126 may track items 108 between different fixtures 920, to and from the totes 918, and so forth. During operation, the inventory management module 1126 may access sensor data 1132, such as the image data 124, data from other sensors 924, and so forth.

The data store 1120 may store one or more threshold values 1134. For example, the threshold values 1134 may include the threshold value used by the footprint module 132 to determine the occlusion location data 306.

An accounting module 1128 may be configured to assess charges to accounts associated with particular users 916 or other entities. For example, the interaction data 912 may indicate that the user 916 has removed a particular item 108 from a fixture 920. Based on the interaction data 912, the accounting module 1128 may assess the charge to a payment instrument associated with the account.

Processing of sensor data 1132, such as the image data 124, may be performed by a module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 1132. In still another implementation, functions such as those in the Machine Vision Toolbox for Matlab (MVTB) available using MATLAB as developed by MathWorks, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 1132 or other data. For example, the ANN may be a trained using a supervised learning algorithm such that object identifiers are associated with images of particular objects within training images provided to the ANN. Once trained, the ANN may be provided with the sensor data 1132 such as the image data to generate identification data of an object.

Other modules 1130 may also be present in the memory 1116 as well as other data 1136 in the data store 1120.

By using the devices and techniques described in this disclosure, the footprint data 136 about items 108 may be determined rapidly regardless of the nature of the item 108. For example, footprint data 136 may be determined for transparent items 108 such as bottles or items 108 with mirror finishes. The footprint data 136 may then be used for identification of the item 108, to control operation of tools 122, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a conveyor belt to move in a direction of movement;
   a linear motion sensor to determine linear motion data indicative of movement of the conveyor belt between a first time and a second time;
   a first line projector to produce on the conveyor belt a first projected line that is perpendicular to the direction of movement, wherein the first line projector is positioned alongside a first side of the conveyor belt;
a first camera positioned alongside the first side of the conveyor belt, wherein the first camera acquires a first image at the first time and a second image at the second time of a portion of the conveyor belt onto which the first projected line is projected;
a second line projector to produce on the conveyor belt a second projected line that is perpendicular to the direction of movement, wherein the second line projector is positioned alongside a second side of the conveyor belt opposite the first side;
a second camera positioned alongside the second side of the conveyor belt, wherein the second camera acquires a third image at the first time and a fourth image at the second time of the portion of the conveyor belt onto which the second projected line is projected;
a memory, storing first computer-executable instructions; and
a hardware processor to execute the first computer-executable instructions to:
determine, for the first image, first occlusion location data indicative of a location of an occlusion of the first projected line by an item on the conveyor belt;
determine, for the second image, second occlusion location data indicative of a location of an occlusion of the first projected line by the item on the conveyor belt;
determine, for the third image, third occlusion location data indicative of a location of an occlusion of the second projected line by the item on the conveyor belt;
determine, for the fourth image, fourth occlusion location data indicative of a location of an occlusion of the second projected line by the item on the conveyor belt;
determine, using the linear motion data, a linear displacement of the conveyor belt with respect to the first and second projected lines between the first time and the second time;
determine for individual ones of a set of images comprising the first image, the second image, the third image, and the fourth image:
a first coordinate along a first axis that is based on the linear motion data associated with a time at which the individual ones of the set of images were acquired, wherein the first axis is parallel to a direction of travel of the conveyor belt; and
determine a second coordinate along a second axis that is orthogonal to the first axis, wherein the second coordinate is representative of a linear measurement along the second axis based on the occlusion location data for the individual ones of the set of images;
determine a plurality of edge points, wherein the first coordinate and the second coordinate for each edge point is obtained from the individual ones of the set of images;
determine one or more fitted lines using the plurality of edge points; and
determine footprint data indicative of an outline of the item using the one or more fitted lines.

2. The system of claim 1, wherein the first computer-executable instructions to determine the first occlusion location data further comprise instructions to:
determine, for the first image, an analysis area;
identify at least a portion of the first projected line in the analysis area; and
determine a feature change in the first projected line within the analysis area that exceeds a threshold value, wherein the feature change comprises one or more of:
a transition from presence to absence of the first projected line,
a change in intensity in the first projected line, or
a change in polarization of the first projected line.

3. The system of claim 1, wherein:
the first line projector is positioned at a first height above a surface of the conveyor belt and the first projected line is directed downward onto the conveyor belt;
the first camera is positioned at a second height above the surface of the conveyor belt and at a first offset distance from the first line projector;
the second line projector is positioned at a third height above the surface of the conveyor belt and the second projected line is directed downward onto the conveyor belt;
the second camera is positioned at a fourth height above the surface of the conveyor belt and at a second offset distance from the second line projector; and
at least a portion of the first projected line and the second projected line on the conveyor belt overlap.

4. A system comprising:
a first line projector at a first location to produce a first projected line onto a surface within a first measurement area;
a first camera at a second location to acquire a first image of the first measurement area;
a second line projector at a third location to produce a second projected line onto the surface within a second measurement area;
a second camera at a fourth location to acquire a second image of the second measurement area;
a memory, storing first computer-executable instructions; and
a hardware processor to execute the first computer-executable instructions to:
determine a first coordinate along a first axis, wherein the first coordinate is representative of a linear displacement along the first axis of the first projected line with respect to an item;
determine first occlusion location data indicative of a location, in the first image, of an occlusion of the first projected line by the item;
determine, based on the first occlusion location data, a second coordinate along a second axis that is orthogonal to the first axis;
determine a first edge point comprising the first coordinate and the second coordinate;
determine a third coordinate along the first axis, wherein the third coordinate is representative of a second linear displacement along the first axis of the second projected line with respect to the item;
determine second occlusion location data indicative of a location, in the second image, of an occlusion of the second projected line by the item;
determine, based on the second occlusion location data, a fourth coordinate along the second axis; and
determine a second edge point comprising the third coordinate and the fourth coordinate.

5. The system of claim 4, wherein the first computer-executable instructions to determine the first occlusion location data further comprise instructions to:

identify at least a portion of the first projected line in the first image; and determine a feature change in the first projected line depicted in the first image, wherein the feature change comprises one or more of:
a change in apparent direction of the first projected line in the first image;
a transition from presence to absence of the first projected line in the first image,
a change in intensity in the first projected line in the first image, or
a change in polarization of the first projected line in the first image.

6. The system of claim 4, further comprising:
the first line projector is positioned at a first height with respect to the surface;
the first camera is positioned at a second height with respect to the surface and at a first offset distance from the first line projector;
the second line projector is positioned at a third height with respect to the surface and the second projected line is projected onto the second measurement area on the surface; and
the second camera is positioned at a fourth height with respect to the surface and at a second offset distance from the second line projector.

7. The system of claim 6, wherein the first line projector and the first camera are positioned alongside a first side of the surface and the second line projector and the second camera are positioned alongside a second side of the surface, wherein the first side is opposite the second side.

8. The system of claim 4, wherein at least a portion of the first measurement area and at least a portion of the second measurement area overlap and at least a portion of the first projected line and at least a portion of the second projected line as projected on the surface overlap.

9. The system of claim 4, further comprising:
the first camera to acquire a third image of the first measurement area;
the second camera to acquire a fourth image of the second measurement area;
wherein:
one or more of the first measurement area or the second measurement area moves from a first location with respect to the surface to a second location with respect to the surface between a first time and a second time;
the first image and the second image are acquired at the first time;
the third image and the fourth image are acquired at the second time; and
the hardware processor to further execute the first computer-executable instructions to:
determine a third edge point based on the third image; and
determine a fourth edge point based on the fourth image.

10. The system of claim 9, the hardware processor to further execute the first computer-executable instructions to:
determine one or more fitted lines based on the first edge point, the second edge point, the third edge point, and the fourth edge point; and
determine at least a portion of a footprint of the item based at least in part on the one or more fitted lines.

11. The system of claim 4, the surface comprising a material that produces a diffuse reflection of the first projected line and the second projected line; and wherein the first occlusion location data is indicative of a point on the surface that is proximate to the occlusion of the first projected line by the item and the second occlusion location data is indicative of a point on the surface that is proximate to the occlusion of the second projected line by the item.

12. The system of claim 4, further comprising:
a printer comprising a printhead;
a second memory, storing second computer-executable instructions; and
a second hardware processor to execute the second computer-executable instructions to:
receive data based at least in part on one or more of the first edge point or the second edge point;
position the printhead with respect to the item based at least in part on the data that is received; and
operate the printhead to apply one or more markings to the item.

13. A system comprising:
a first line projector at a first position to produce a first projected line on a surface within a first measurement area, wherein the first line projector is positioned at a first non-zero height with respect to the surface;
a first camera at a second position having a field-of-view that includes at least a portion of the first measurement area, wherein
the first camera is positioned at a first non-zero offset distance from the first line projector;
a second line projector to produce a second projected line on the surface within a second measurement area;
a second camera having a second field-of-view that includes at least a portion of the second measurement area;
a memory, storing first computer-executable instructions; and
a hardware processor to execute the first computer-executable instructions to:
acquire a first set of one or more images from the first camera;
process one or more of the first set of one or more images to determine a first set of edge points based on occlusion data indicative of an occlusion of the first projected line by an item on the surface;
acquire a second set of one or more images from the second camera;
process one or more of the second set of one or more images to determine a second set of edge points based on occlusion data indicative of an occlusion of the second projected line by the item on the surface; and
determine footprint data based on one or more of the first set of edge points or second set of edge points.

14. The system of claim 13, wherein the first set of edge points are indicative of a location on the surface that is proximate to the occlusion of the first projected line by the item on the surface.

15. The system of claim 13, wherein the surface comprises a material that produces a diffuse reflection of light from at least the first line projector.

16. The system of claim 13, wherein the footprint data is indicative of one or more of a boundary of the item proximate to the surface or a location of at least a portion of the item.

17. The system of claim 13, further comprising:
an actuator;
the memory storing second computer-executable instructions; and the hardware processor to further execute the second computer-executable instructions to:
  operate the actuator to provide a relative displacement of the item on the surface with respect to the first projected line;
  determine a relative displacement value indicative of the relative displacement;
  determine at least one coordinate for an individual edge point in the first set of edge points based on the relative displacement value; and
  wherein individual images of the first set of one or more images are acquired at different relative displacement values.

18. The system of claim 13, further comprising:
one or more markings on the surface;
the memory storing second computer-executable instructions; and
the hardware processor to further execute the second computer-executable instructions to:
  determine a relative displacement value of an image in the first set of one or more images based on the one or more markings on the surface that are present in the image; and
  wherein for a first edge point in the first set of edge points, a first coordinate is based at least in part on the relative displacement value for the image.

19. The system of claim 13, further comprising:
the memory storing second computer-executable instructions; and
the hardware processor to further execute the second computer-executable instructions to:
  access data indicative of a plurality of candidate item shapes;
  determine a correspondence between at least a portion of the first set of edge points and one of the plurality of candidate item shapes that exceeds a threshold value; and
  wherein the footprint data is indicative of the one of the plurality of candidate item shapes.

20. The system of claim 13, further comprising:
the memory storing second computer-executable instructions to determine the occlusion data; and
the hardware processor to execute the second computer-executable instructions to:
  identify, in an individual one of the first set of one or more images, at least a portion of the first projected line; and
  determine a feature change in the first projected line on the surface, wherein the feature change comprises one or more of:
    a change in apparent direction of the first projected line;
    a transition from presence to absence of the first projected line,
    a change in intensity in the first projected line, or
    a change in polarization of the first projected line.

* * * * *